(12) United States Patent
Quintens et al.

(10) Patent No.: US 8,974,876 B2
(45) Date of Patent: Mar. 10, 2015

(54) PRINTABLE PAPER, COMPRISING WATER-RESISTANT SUPPORT

(75) Inventors: Dirk Quintens, Westerlo (BE); Dirk Franky Kokkelenberg, St. Niklaas (BE)

(73) Assignee: Agfa-Gevaert, Mortsel (BE)

( * ) Notice: Subject to any disclaimer, the term of this patent is extended or adjusted under 35 U.S.C. 154(b) by 158 days.

(21) Appl. No.: 13/598,309

(22) Filed: Aug. 29, 2012

(65) Prior Publication Data

US 2012/0321784 A1 Dec. 20, 2012

Related U.S. Application Data

(63) Continuation of application No. 12/402,599, filed on Mar. 12, 2009, now Pat. No. 8,357,447.

(60) Provisional application No. 61/037,472, filed on Mar. 18, 2008.

(30) Foreign Application Priority Data

Mar. 18, 2008 (EP) .................................. 08102728

(51) Int. Cl.
| | | |
|---|---|---|
| *B41M 5/00* | (2006.01) | |
| *B41M 5/52* | (2006.01) | |
| *B32B 27/08* | (2006.01) | |
| *B32B 27/36* | (2006.01) | |
| *B41M 5/50* | (2006.01) | |
| *B32B 27/40* | (2006.01) | |
| *D21H 17/20* | (2006.01) | |
| *D21H 19/36* | (2006.01) | |
| *D21H 19/56* | (2006.01) | |
| *D21H 19/72* | (2006.01) | |
| *D21H 19/84* | (2006.01) | |

(52) U.S. Cl.
CPC .............. *B41M 5/52* (2013.01); *B41M 5/5254* (2013.01); *B32B 27/08* (2013.01); *B41M 5/5218* (2013.01); *B32B 27/36* (2013.01); *B41M 5/508* (2013.01); *B41M 5/506* (2013.01); *B32B 27/40* (2013.01); *D21H 17/20* (2013.01); *D21H 19/36* (2013.01); *D21H 19/56* (2013.01); *D21H 19/72* (2013.01); *D21H 19/84* (2013.01)
USPC .................. 428/32.17; 428/32.21; 428/32.32; 428/32.34; 428/32.38; 428/423.1; 428/480

(58) Field of Classification Search
CPC ...... B41M 5/508; B41M 5/52; B41M 5/5254; B41M 5/5218; B41M 5/506; B32B 27/36; B32B 27/40; B32B 27/08
USPC .......... 428/32.17, 32.21, 32.32, 32.34, 32.38, 428/423.1, 480
See application file for complete search history.

(56) References Cited

U.S. PATENT DOCUMENTS

| | | |
|---|---|---|
| 3,944,699 A | 3/1976 | Mathews et al. |
| 5,397,637 A | 3/1995 | Asami et al. |
| 5,457,018 A | 10/1995 | Sommer et al. |
| 5,707,716 A | 1/1998 | Yoshino et al. |
| 5,759,673 A | 6/1998 | Ikezawa et al. |
| 5,952,104 A | 9/1999 | Sugiyama et al. |
| 6,300,393 B1 | 10/2001 | Hudson et al. |
| 6,447,882 B1 | 9/2002 | Sunderrajan et al. |
| 8,357,447 B2 | 1/2013 | Quintens et al. |
| 2001/0024713 A1* | 9/2001 | Quintens et al. .............. 428/195 |
| 2003/0044586 A1 | 3/2003 | Nojima et al. |
| 2004/0146699 A1 | 7/2004 | Dalgleish et al. |
| 2006/0257593 A1 | 11/2006 | Haenen |

FOREIGN PATENT DOCUMENTS

| | | |
|---|---|---|
| EP | 0496323 A2 | 7/1992 |
| EP | 1 743 976 A1 | 1/2007 |
| GB | 2 177 413 A | 1/1987 |
| JP | 11-107194 A | 4/1990 |
| JP | 2006 272562 A | 10/2006 |
| JP | 2007 160799 A | 6/2007 |
| JP | 2007 290339 A | 11/2007 |
| WO | WO 03/033577 A1 | 4/2003 |

OTHER PUBLICATIONS

Lunk and Stange, Angewandte Chemie International Ed., vol. 10, pp. 287-294 (1971).
European Search Report for Application No. EP08102728 (Aug. 18, 2008).

\* cited by examiner

*Primary Examiner* — Betelhem Shewareged
(74) *Attorney, Agent, or Firm* — Leydig, Voit & Mayer, Ltd.

(57) ABSTRACT

Disclosed is a printable paper comprising a water-resistant support having two optionally subbed sides and a single layer on at least one of said optionally subbed sides, wherein said single layer has no substantial compositional variation, has a layer thickness of at least 3 µm, a pore volume of at least 1.2 mL/m² and comprises at least one porous pigment. Also disclosed is a process for producing such a printable paper and use thereof in printing.

8 Claims, No Drawings

PRINTABLE PAPER, COMPRISING WATER-RESISTANT SUPPORT

CROSS-REFERENCE TO RELATED PATENT APPLICATIONS

This application is a continuation of copending U.S. patent application Ser. No. 12/402,599, filed on Mar. 12, 2009, which claims the benefit of U.S. Provisional Application No. 61/037,472 filed on Mar. 18, 2008, and the benefit of European Patent Application No. 08102728.6 filed on Mar. 18, 2008, each of which is incorporated by reference.

FIELD OF THE INVENTION

The present invention concerns a printable paper, a process for producing printable paper, and the use thereof in offset printing.

BACKGROUND OF THE INVENTION

Synthetic papers may be classified into two different types: one with a fibrous structure like cellulose paper, with synthetic fibers made from polyamides, polyester, or polyolefins replacing the cellulose fibers; and one in which a film is directly extruded from a thermoplastic polymer. These products differ considerably in their structure from cellulose paper and thus present a variety of different problems.

Extruded film is produced either by the cast film process or the blown film process in which the melt is forced through a circular die. A variant of the blown film process is the extrusion of foamed film in which through the addition of blowing agents (usually low boiling hydrocarbons) it is possible to produce foamed film from a variety of polymers. Two methods are used for the biaxial stretching of cast film: the simultaneous stretching process, in which the stretching is carried out in both directions at the same time, and the two-stage process, in which the two stretching operations are carried out consecutively.

Extruded films have a smooth surface which depends more on the state of the chill rolls than on the material itself. There are no cavities with capillary activity such as between the fibers of cellulose paper or synthetic fiber webs. This combination of smooth surface, low absorbing power, and non-polar structure frequently makes it difficult to print on polymer films: drying times are long, and the adhesion of the printing ink is poor.

Lunk and Stange in 1971 in Angewandte Chemie International Edition, volume 10, pages 287-294 stated that one type of surface treatment to improve the printability of extruded films is the application of a pigment coating. In the paper industry, the improvement of the surface of cellulose paper with a pigment coating had been known for some time. Typical binders for these coatings were casein, polyacrylates, or copolymers of butadiene and styrene. China clay, barium sulfate, chalk, or titanium dioxide were used as pigments. In spite of their closed, smooth surface coated papers were sufficiently absorptive for letterpress and offset printing because of their high content of mineral filler. Coated polymer films had similar properties; they could also be used for all printing processes, and the print quality was equal to that of coated papers. However, the demands of the printing industry have increased since 1971 requiring papers with ever higher printability.

GB 2 177 413A discloses a coating composition for a plastics substrate and comprising an aqueous system containing polymeric binder, pigment and antistatic agent characterised in that the binder contains carboxyl groups, that the binder:pigment dry weight ratio is in the range 15:100 to 50:100, preferably 22:100 to 35:100, the antistatic agent comprises a water soluble ionic compound present in an amount corresponding to a dry weight:pigment ratio of from 0.4:100 to 2.5:100 and in that the composition also contains an insolubilizing agent which is capable of reacting with carboxyl groups of the binder on drying the composition to insolubilize (as hereinbefore defined) the binder.

U.S. Pat. No. 5,397,637 discloses a thermoplastic resin film with satisfactory printability having a coated layer comprising a quaternary ammonium salt copolymer comprising (a) a structural unit represented by formula (I):

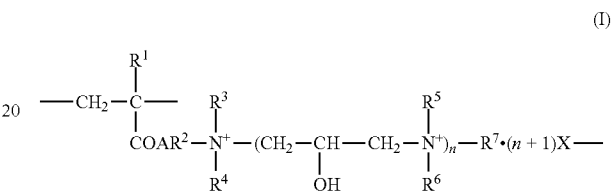

wherein A represents —O— or —NH—; $R^1$ represents a hydrogen atom or a methyl group; $R^2$ represents an alkylene group having from 2 to 4 carbon atoms or —$CH_2CH(OH)$—$CH_2$—; $R^3$, $R^4$, $R^5$, and $R^6$, which may be the same or different, each represents an alkyl group having from 1 to 3 carbon atoms; $R^7$ represents an alkyl group having from 1 to 10 carbon atoms or an aralkyl group having from 7 to 10 carbon atoms; n represents an integer of from 1 to 3; and X represents a chlorine atom, a bromine atom or an iodine atom, (b) a structural unit represented by formula (II):

wherein $R^8$ represents a hydrogen atom or a methyl group; and $R^9$ represents an alkyl group having from 1 to 22 carbon atoms, an aralkyl group having from 7 to 22 carbon atoms or a cycloalkyl group having from 5 to 22 carbon atoms, and (c) a structural unit derived from a monomer copolymerizable with monomers providing structural units (a) and (b) at a (a):(b):(c) weight ratio of 30 to 70:30 to 70:0 to 40.

JP 11-107194 discloses an offset-printable synthetic paper characterized by providing at least one side of a synthetic substrate with 1-7 g/m² of a coating layer comprising 20 to 50 wt % of polyvinyl alcohol, 20 to 50 wt % of a polyurethane resin and 20 to 50 wt % of a silica pigment, with it being preferred that the polyurethane resin is a carboxyl-containing crosslinkable polyurethane resins or a polyester-based polyurethane resin and the particle size of the silica pigment is 2-5 µm, and the synthetic paper has 20-50% opacity determined in accordance with the JIS P 8138.

U.S. Pat. No. 6,300,393 discloses a paper coating composition comprising (a) at least one binder containing a plurality of functional groups capable of reacting with carboxylic acid anhydride moieties to form chemical bonds, and (b) at least one insolubilizing agent chosen from the froup consisting of compounds containing a plurality of carboxylic acid anhydride moieties per molecukar entity.

WO 03/033577A discloses a printable, opaque coated sheet, suitable for use in contact and/or association with foodstuffs, the coating comprising by dry weight of the coat: (a) from about 30% to about 70% of a copolymer of an ethylenically unsaturated acid; (b) from about 30% to about 70% of an inert particulate filler; where the coating is substantially free from any reactive binder and/or cross-linking agent. WO 03/033577A further discloses that the ethylenically unsaturated acid is preferably neutralised by ammonia and not metal cations, since this has the advantage that on drying ammonia evaporates and acid groups become less moisture sensitive compared to metal cation stabilised ethylene acrylic acid (EAA) copolymer dispersions.

US 2004/0146699A1 discloses a composite plastics sheet which is printable on at least one surface, and comprises a base layer and optionally a printable layer forming the printable surface, characterized in that the base layer has a density of 0.65 g/mL or less, or, if there is no separate adhesive layer on the surface opposite the printable surface, a density of 0.7 g/mL or less.

US 2006/0257593A1 discloses a printing sheet comprising a substrate and, on at least one side of the substrate, an image receptive coating layer with a cumulative porosity volume of pore widths below 200 nm as measured using nitrogen intrusion methods of more than 0.006 cm$^3$ per gram paper.

EP 1 743 976A1 discloses a coated printing sheet for sheet-fed offset printing with an image receptive coating layer on a paper substrate, characterized in that the image receptive coating layer comprises a top layer and/or at least one second layer below said top layer, said top and/or second layer comprising: a pigment part, wherein this pigment part is composed of 0 to 99 parts in dry weight of a fine particulate carbonate and/or of a fine particulate kaolin 1 to 100 parts in dry weight of a fine particulate silica and a binder part, wherein this binder part is composed of: 5-20 parts in dry weight of binder and less than 4 parts in dry weight of additives.

As the foregoing present certain disadvantages, a need exists for an improved paper for use in printing processes.

SUMMARY OF THE INVENTION

In one aspect the present invention provides a printable paper comprising a water-resistant support having two optionally subbed sides and a single layer on at least one of said optionally subbed sides, wherein said single layer has no substantial compositional variation, has a layer thickness of at least 3 µm, a pore volume of at least 1.2 mL/m$^2$ and comprises at least one porous pigment.

A further aspect of the invention provides a process for producing a printable paper comprising the steps of: (i) optionally providing a water-resistant support having two sides with a subbing layer on at least one side; and (ii) providing at least one side of said optionally subbed water-resistant support with a single layer having no substantial compositional variation, said single layer being applied to said optionally subbed water-resistant support as at least one wet aqueous layer in a single pass for each side of said water-resistant support, said at least one aqueous layer comprising at least one latex, at least one pigment, at least one binder and optionally at least one insolubilizing agent, wherein said latex is an anionic acrylic latex or an aliphatic polyurethane latex.

Another aspect of the present invention contemplates the use in printing of the above-described printable paper or that obtained by the above-described production process.

Further aspects and advantages of the invention will become apparent from the detailed description of the invention.

DETAILED DESCRIPTION OF THE INVENTION

Definitions

The term "printable paper", as used in disclosing the present invention, means paper or a paper-like material capable of being printed by at least one conventional contact or contactless printing technique e.g. offset printing, gravure printing, screen printing, flexographic printing, electrophotographic printing and ink jet printing.

The term "overprintable", as used in disclosing the present invention, means capable of being overprinted by conventional impact and/or non-impact printing processes.

The term "conventional printing processes", as used in disclosing the present invention, includes but is not restricted to ink jet printing, intaglio printing, screen printing, flexographic printing, offset printing, stamp printing, gravure printing, dye transfer printing, thermal sublimation printing and thermal and laser-induced processes.

The term "support", as used in disclosing the present invention, means a "self-supporting material" so as to distinguish it from a "layer" which may be coated as a solution or dispersion, evaporated or sputtered on a support, but which itself is not self-supporting. It also includes an optional conductive surface layer and any treatment necessary for, or layer applied to aid, adhesion.

The term "subbing layer", as used in disclosing the present invention, means any layer or layer configuration required to realize adhesion between the support and the single layer, but plays no role in the printing performance of the printable paper.

The term "water-resistant support", as used in disclosing the present invention, means a support the surfaces of which are resistant to water e.g. synthetic paper and resin-coated cellulosic paper.

The term "layer", as used in disclosing the present invention, means a (continuous) coating covering the whole area of the entity referred to e.g. a support.

The term "single layer", as used in disclosing the present invention, means there is only one layer on each side of the water-resistant support, although it may be applied as a plurality of wet layers in a single pass. The "single layer" has receiving properties, since otherwise the "printable paper" would not be printable.

The term "no substantial compositional variation", as used in disclosing the present invention, means that although the layer may be coated as a plurality of wet layers the layer resulting therefrom has a compositional variation of no more than 5% by weight.

The term "porous pigment", as used in disclosing the present invention, embraces both pigments having primary particles having an internal porosity e.g. a silica gel particles and pigments whose primary particles have no internal porosity and have a specific surface area of at least 100 m$^2$/g, which are present as secondary particles having an internal porosity as a result of the aggregation of the primary particles e.g. flame pyrolyzed inorganic particles such as the particles in the Aerosil® range produced by Degussa.

The term "latex", as used in disclosing the present invention, means that the latex polymer is substantially insoluble in water i.e. having a solubility in water of less than 10 mg per 100 g water at a temperature of 25° C., is prepared by standard latex preparation techniques and is supplied and used as an aqueous dispersion.

The term "water-soluble binder", as used in disclosing the present invention, means a binder with a solubility in water of at least 1 g per 100 g water at a temperature of 25° C.

The term "inorganic opacifying pigment", as used in disclosing the present application, means a pigment capable of opacifying (i.e. rendering more opaque) which includes substantially white inorganic pigments having a refractive index of at least 1.4 and pigments, which as a dispersion in a polymer are capable upon stretching of causing opacity due to microvoiding.

The term "whitening agent", as used in disclosing the present invention, means a white/colourless organic compound which exhibits a blue luminescence under the influence of ambient UV-light.

The term "insolubilizing agent", as used in disclosing the present invention, means an agent capable of insolubilizing the latex.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the dispersion medium under the pertaining ambient conditions, hence having a solubility of less than 10 mg/L therein.

The term "synthetic paper", as used in disclosing the present invention, means a paper-like material produced either by forming a web from synthetic fibres or by extruding a film from thermoplastic polymers optionally coated on one or both sides with a receiving layer.

The term "film", as used in disclosing the present invention, is an extruded sheet of a particular composition or a sheet consisting of a multiplicity of films with the same or different compositions produced by co-extrusion of liquids with the same or different compositions in contact with one another. The terms film and foil are used interchangeably in the present disclosure The term linear polyester, as used in disclosing the present invention, means a polyester comprising hydrocarbon dimethylene and dicarboxylate monomer units.

The term "non-transparent film", as used in disclosing the present invention, means a film capable of providing sufficient contrast to a transparent image to make the image clearly perceptible. A non-transparent film can be an "opaque film", but need not necessarily be completely opaque in that there is no residual translucence i.e. no light penetration through the film. Optical density in transmission as measured with a MacBeth TR924 densitometer through a visible filter can provide a measure of the non-transparency of a film. ISO 2471 concerns the opacity of paper backing and is applicable when that property of a paper is involved that governs the extent to which one sheet visually obscures printed matter on underlying sheets of similar paper and defines opacity as "the ratio, expressed as a percentage, of the luminous reflectance factor of a single sheet of the paper with a black backing to the intrinsic luminous reflectance factor of the same sample with a white reflecting backing. 80 g/m² copy paper, for example, is white, non-transparent and has an optical density of 0.5 as measured with a MacBeth TR924 densitometer through a yellow filter according to ISO 5-2 and metallized films typically have an optical density ranging from 2.0 to 3.0.

The term "voids or microvoids", as used in disclosing the present invention, means microcells, minute closed cells, cavities, bubbles or pores or cellulation, which, for example, can be formed in an oriented polymeric film during stretching as the result of a void-initiating particle initiated by particles that are immiscible with the polyester matrix. The voids or microvoids can be unfilled or filled with air or a vapour of some sort. Even if initially unfilled the voids or microvoids may over time become filled with air or a vapour of some sort.

The term "foam", as used in disclosing the present invention, means a substance that is formed by trapping many gas bubbles in a liquid or solid.

The term "apparent density", as used in disclosing the present invention, means the weight of a 100 mm×100 mm piece of film with a thickness measured in contact with an inductive probe with ball tip 3 mm in diameter divided by its volume. This value assumes that the surfaces of the piece of film are flat and parallel to one another. This value corresponds to the apparent density values reported in EP-A 0 496 323 and WO 2005/105903A.

Printable Paper

Aspects of the present invention are realized by a printable paper comprising a water-resistant support having two optionally subbed sides and a single layer on at least one of said optionally subbed sides, wherein said single layer has no substantial compositional variation, has a layer thickness of at least 3 μm, a pore volume of at least 1.2 mL/m² and comprises at least one porous pigment, with a pore volume of at least 1.5 mL/m² being preferred.

The printing paper, according to the present invention, may be coated on both sides each with a single layer in a single pass. However, if coated on one side the non-coated side may be provided with an adhesive layer for label applications.

Porosity can be determined by standard techniques such as nitrogen porosimetry, in which nitrogen is condensed in the pores and calculating the pore volumes from the quantities of gas required to fill the pores, and mercury porosimetry, in which liquid mercury is forced into pores by increasing the external pressure, the amount of mercury required to fill the pores being increased incrementally.

According to a first embodiment of the printable paper, according to the present invention, the printable paper is exclusive of an antistatic agent comprising a water-soluble ionic inorganic compound.

According to a second embodiment of the printable paper, according to the present invention, the opacity of said printable paper determined according to ASTM D589 C/2° is greater than 90%.

According to a third embodiment of the printable paper, according to the present invention, the single layer further comprises a hardened melamine-formaldehyde resin e.g. by hardening Madurit MW15 from Vianova Resins N.V.

According to a fourth embodiment of the present invention, the single layer further contains a hardened proteinaceous substance e.g. by the hardening of the ammonium salt of casein.

Water-Resistant Support

According to a fifth embodiment of the printable paper, according to the present invention, said water-resistant support is provided with a subbing layer on at least one side thereof.

The term "water-resistant support", as used in disclosing the present invention, means a support the surfaces of which are resistant to water. Such supports enable overcoating with aqueous solutions or dispersions without affecting the "water-resistant support".

Water-resistant supports include resin-coated cellulosic paper, webs having a fibrous structure formed with synthetic fibers and webs in which a film is directly extruded from a thermoplastic polymer. The resin-coating of resin-coated cellulosic paper can be rendered non-transparent by the inclusion of opacifying pigments therein. Webs having a fibrous structure formed with synthetic fibers and webs in which a film is directly extruded from a thermoplastic polymer can be rendered non-transparent by the inclusion of opacifying pigments. Furthermore, webs in which a film is directly extruded from a thermoplastic polymer can be also rendered non-transparent by axial stretching-induced microvoid formation resulting from the presence of poorly compatible dispersions of amorphous high polymers with a higher glass transition temperature than the glass transition temperature or melting point of the matrix polymer and/or the crystalline high polymers which melt at a higher temperature than the glass transition temperature or melting point of the matrix polymer and axially stretching the extruded film. Widely used matrix polymers include polyethylene, polypropylene, polystyrene, polyamide and polyester.

According to a sixth embodiment of the printable paper, according to the present invention, said water-resistant support is resin-coated cellulosic paper, a web having a fibrous structure formed with synthetic fibers or a web in which a film is directly extruded from a thermoplastic polymer.

According to a seventh embodiment of the printable paper, according to the present invention, said water-resistant support comprises at least 50% by weight of a linear polyester.

According to an eighth embodiment of the printable paper, according to the present invention, said water-resistant support comprises at least 50% by weight of a linear polyester and an opacifying pigment, the opacifying pigment being preferably selected from the group consisting of silica, zinc oxide, zinc sulphide, lithopone, barium sulphate, calcium carbonate, titanium dioxide, aluminium phosphate and clays.

According to a ninth embodiment of the printable paper, according to the present invention, said water-resistant support is a non-transparent microvoided axially stretched directly extruded thermoplastic polymer comprising dispersed therein at least one amorphous high polymer with a higher glass transition temperature than the glass transition temperature of the thermoplastic polymer and/or at least one crystalline high polymer having a melting point which is higher than the glass transition of the thermoplastic polymer.

According to a tenth embodiment of the printable paper, according to the present invention, said water-resistant support is a non-transparent microvoided axially stretched directly extruded linear polyester having dispersed therein at least one amorphous high polymer having a higher glass transition temperature than that of said linear polyester and/or at least one crystalline high polymer having a higher melting point than the glass transition temperature of said linear polyester matrix, the amorphous high polymer preferably comprising at least one chain-polymerized block.

According to an eleventh embodiment of the printable paper, according to the present invention, said water-resistant support is a non-transparent microvoided axially stretched directly extruded linear polyester having dispersed therein at least one amorphous high polymer having a higher glass transition temperature than that of said linear polyester and/or at least one crystalline high polymer having a higher melting point than the glass transition temperature of said linear polyester matrix, wherein said at least amorphous high polymer is selected from the group consisting of polystyrene, styrene copolymers, SAN-polymers, polyacrylates, acrylate-copolymers, polymethacrylates and methacrylate-copolymers, According to a twelfth embodiment of the printable paper, according to the present invention, said water-resistant support is a non-transparent microvoided axially stretched directly extruded linear polyester having dispersed therein at least one amorphous high polymer having a higher glass transition temperature than that of said linear polyester and/or at least one crystalline high polymer having a higher melting point than the glass transition temperature of said linear polyester matrix, wherein said crystalline high polymer is selected from the group consisting of polyethylene, preferably high density polyethylene, polypropylene, preferably isotactic polypropylene, and isotactic poly(4-methyl-1-pentene).

According to a thirteenth eleventh embodiment of the printable paper, according to the present invention, said water-resistant support is a non-transparent microvoided axially stretched directly extruded linear polyester having dispersed therein particles of a SAN-polymer and/or at least one crystalline high polymer which has a melting point at a higher temperature than the glass transition temperature of the polyester, with at least one crystalline high polymer selected from the group consisting of high density polyethylene, isotactic polypropylene and isotactic poly(4-methyl-1-pentene) being preferred.

According to a fourteenth embodiment of the printable paper, according to the present invention, said water-resistant support is a non-transparent microvoided axially stretched directly extruded linear polyester having dispersed therein particles of at least one amorphous high polymer with a higher glass transition temperature than the glass transition temperature of the linear polyester and/or isotactic poly(4-methyl-1-pentene), with at least one amorphous high polymer selected from the group consisting of SAN (styrene-acrylonitrile)-polymers and ABS (acrylonitrile-butadiene-styrene)-polymers being preferred.

According to a fifteenth embodiment of the printable paper, according to the present invention, said water-resistant support is a non-transparent microvoided axially stretched directly extruded linear polyester having dispersed therein 5 to 20% by weight of a styrene-acrylonitrile-block copolymer and 0.1 to 10% by weight of isotactic poly(4-methyl-1-pentene).

According to a sixteenth embodiment of the printable paper, according to the present invention, said water-resistant support further comprises an ingredient selected from the group consisting of whitening agents, UV-absorbers, light stabilizers, antioxidants, flame retardants and colorants.

Latex

According to a seventeenth embodiment of the printable paper, according to the present invention, the single layer further comprises a latex, the latex being preferably an anionic acrylic latex or an aliphatic polyurethane latex.

According to an eighteenth embodiment of the printable paper, according to the present invention, the latex is a self-crosslinking latex.

Suitable latexes are given in the table below:

| latex No. | | | solids conc [wt %] | acid No. [mg KOH/g] | pH | comonomers | | |
|---|---|---|---|---|---|---|---|---|
| 01 | Joncryl FLX5000 | BASF | 42 | 90 | 8.5 | styrene | 2-ethyl-hexyl acrylate α-methyl-styrene | ammonium acrylate |
| 02 | Joncryl 8078 | BASF | 32 | 216 | 8.3 | styrene | α-methyl-styrene | ammonium acrylate |
| 03 | Dispercoll U53 | BAYER | 40 | | | | aliphatic PU | |
| 04 | Joncryl FLX5010 | BASF | 46 | <10 | 8.5 | styrene | acrylate | ammonium acrylate |
| 05 | Joncryl 8050 | BASF | 42 | 111* | 7.8 | styrene | acrylate | methacrylate |
| 06 | Hycar PC84 | Dow Chemical | 48 | | 6.0 | styrene | acrylic acid | acrylonitrile ethyl acrylate N-hydroxy-methyl-acrylamide |
| 07 | Carboset GA2364 | Goodrich | 59 | | 6 | styrene | acrylate | |
| 08 | Joncryl 8385 | BASF | 49 | 16 | 7.9 | quat. mod | acrylate | |
| 09 | Enorax PU950 | Collano | 30 | | 4.5 | cationic | PU | |
| 10 | wac-17XC | Takamatu Oil & Fat Co. Ltd | 25 | | 8 | anionic | polyester PU | |
| 11 | Cromelastic C4480 | Cromogenia-units S.A. | | | 8.3 | cationic | aliphatic PU | |
| 12 | Mowilith DM 2452 | Clariant | | | 6 | vinyl acetate | veova (vinyl versatate) | acrylate |
| 13 | Wellpur FM10C | Van Camp Chemicals | 30 | | 5 | cationic | aliphatic PU | |
| 14 | Neorez R989 | Avecia | 40 | | 8.3 | | aliphatic PU | |
| 15 | Jetsize CE225 | Eka Nobel | | | | cationic monomer | styrene | acrylate |
| 16 | Hycar 26084 | Lubriziol | 49 | | | | carboxy-modified acrylic | |
| 17 | Hycar 2679 | Lubrizol | 49 | | | acrylic | | |
| 18 | Hycar 2671 | Lubrizol | 51 | | | | acrylate | acrylonitrile |
| 19 | Impranil DLU | BAYER | 60 | | | | anionic aliphatic | polyester-polyurethane |
| 20 | Impranil LP RSC1997 | BAYER | | | | | | polyurethane |
| 21 | Impranil LP RSC3040 | BAYER | | | | | | polyurethane |
| 22 | Bayhydrol XP2558 | BAYER | | | | | | |
| 23 | Airflex EP17 | Air Products | 60 | | | | vinyl acetate | ethylene |
| 24 | Polysol EVA550 | Showa Denko K.K. | 55 | | | | vinyl acetate | ethylene |

*from low-MW alkali-soluble styrene/acrylate copolymer

In the case of those latexes with high pH's and good water and alkaline resistance, it is possible that the latex or a stabilizing dispersing agent is solubilized with ammonium hydroxide and with the evaporation of the ammonia the resins are rendered insoluble.

Suitable self-crosslinking resins are given in the Table below.

| latex No. | | | solids conc [wt %] | acid No. [mg KOH/g] | pH | comonomers |
|---|---|---|---|---|---|---|
| 25 | Acronal LR 8977 | BASF | 50 | | 8.5-10 | acrylic |
| 26 | Acronal S 760 | BASF | 50 | | 8.5-10 | acrylic |
| 27 | Joncryl 1580 | BASF | 41 | | 8.3 | acrylic |
| 28 | Joncryl 8380 | BASF | 41 | | 8.2 | acrylic |
| 29 | Joncryl 8383 | BASF | 40 | 23 | 8.1 | acrylic |
| 30 | Joncryl 8384 | BASF | 41 | 27 | 8.2 | acrylic |
| 31 | Joncryl 8385 | BASF | 49 | 16 | 7.9 | acrylic |
| 32 | Joncryl 8386 | BASF | 40 | 18 | 8.0 | acrylic |
| 33 | Joncryl 8300 | BASF | 43.5 | 50 | 9.6 | acrylic |
| 34 | Joncryl 8311 | BASF | 42 | 26 | 7.6 | acrylic |
| 35 | Luhydran S 937 T | BASF | 45 | 0 | 1.5-2.5 | acrylic |
| 36 | NeoCryl XK-98 | DSM Neo-Resins | | | | acrylate |
| 37 | NeoPac R-9029 | DSM Neo-Resins | | | | aliphatic urethane hybrid |

The mechanism of self-crosslinking is not disclosed. However, one skilled in the art would expect crosslinking to be accompanied by insolubilization.

Porous Pigment Particles

According to a nineteenth embodiment of the printable paper, according to the present invention, the porous pigment is an inorganic pigment and includes pigments having primary particles having an internal porosity and pigments whose primary particles have no internal porosity and have a specific surface area of at least 100 $m^2/g$, which are present as secondary particles having an internal porosity as a result of the aggregation of the primary particles. Examples of such primary particles are flame pyrolyzed inorganic particles such as the particles in the Aerosil® range produced by Degussa.

According to a twentieth embodiment of the printable paper, according to the present invention, the at least one porous pigment is an polymeric pigment and includes polymeric pigments having primary particles having an internal porosity and pigments whose primary particles have no internal porosity and have a specific surface area of at least 100 $m^2/g$, which are present as secondary particles having an internal porosity as a result of the aggregation of the primary particles.

According to a twenty-first embodiment of the printable paper, according to the present invention, the at least one porous pigment is a mixture of at least one inorganic porous pigment and at least one organic polymeric porous pigment.

Suitable porous inorganic pigments are given in the table below:

| PP-No. | Product name | Producer | Chemical composition | Average particle size [µm] | pH | Pore volume [mL/g] | Pore diameter [nm] | Oil absorption capacity [mL/100 g] | Surface treatment |
|---|---|---|---|---|---|---|---|---|---|
| 01 | Sunsphere H53 | Asahi Glass | $SiO_2$ | 5 | | 2 | 30 | 400 | |
| 02 | Sunsphere H33 | Asahi Glass | $SiO_2$ | 3 | | 2 | 30 | 400 | |
| 03 | Sunsphere H52 | Asahi Glass | $SiO_2$ | 5 | | 2 | 25 | 300 | |
| 04 | Sunsphere H32 | Asahi Glass | $SiO_2$ | 3 | | 2 | 25 | 300 | |
| 05 | Sunsphere H52 | Asahi Glass | $SiO_2$ | 5 | | 2 | 25 | 300 | |
| 06 | Sunsphere H32 | Asahi Glass | $SiO_2$ | 3 | | 2 | 25 | 300 | |
| 07 | Sunsphere H51 | Asahi Glass | $SiO_2$ | 5 | | 1 | 5 | 150 | |
| 08 | Sunsphere H31 | Asahi Glass | $SiO_2$ | 3 | | 1 | 5 | 150 | |
| 09 | Sunsil 130H-SC | Sunjin | $SiO_2$ | 7 | | 1.4 | | | methicone treated |
| 10 | Sunsil 130SH | Sunjin | $SiO_2$ | 7 | | 2.2 | | | none |

-continued

| PP-No. | Product name | Producer | Chemical composition | Average particle size [μm] | pH | Pore volume [mL/g] | Pore diameter [nm] | Oil absorption capacity [mL/100 g] | Surface treatment |
|---|---|---|---|---|---|---|---|---|---|
| 11 | Sunsil 130XH | Sunjin | SiO$_2$ | 7 | | 3.0 | | | none |
| 12 | Syloid C803 | Grace-Davison | SiO$_2$ | 3.4-4.0 | 2.9-3.7 | 2.0 | | | none |
| 13 | Syloid C807 | Grace-Davison | SiO$_2$ | 6.7-7.9 | 2.9-3.7 | 2.0 | | | none |
| 14 | Syloid C2006 | Grace-Davison | SiO$_2$ | 5.4-6.6 | 3.5 | 2.0 | | | 20% special organic |
| 13 15 | Syloid ED2 | Grace-Davison | SiO$_2$ | 3.9 | 6.0 | | | | none |
| 16 | Syloid ED5 | Grace-Davison | SiO$_2$ | 8.4-10.2 | 6.0-8.5 | 1.8 | | | none |
| 17 | Syloid W500 | Grace-Davison | SiO$_2$ | 7.8-9.4 | 8.7-9.7 | 1.2 | | | none |
| 18 | Syloid W300 | Grace-Davison | SiO$_2$ | 5.3-6.3 | 8.7-9.7 | 1.2 | | | none |
| 19 | Syloid 72 | Grace-Davison | SiO$_2$ | 4.5-5.7 | 6.0-8.0 | 1.2 | | | npne |
| 20 | Syloid 74 | Grace-Davison | SiO$_2$ | 5.9-7.5 | 6.0-8.0 | 1.2 | | | none |
| 21 | Syloid 244 | Grace-Davison | SiO$_2$ | 2.5-3.7 | 6.0-8.0 | 1.6 | | | none |
| 22 | Spheron L1500 | CCIC/Ikeda | SiO$_2$ | 3-15 | | 1.46 | | | |
| 23 | Spheron P1500 | CCIC/Ikeda | SiO$_2$ | 7 | | 0.65-0.7 | | | |
| 24 | ZeeoSphere G200 | 3M | SiO$_2$; Al$_2$O$_3$ | 5 | >3 | | | 70 | |
| 25 | Micral 9400 | J. M. Huber | Al(OH)$_3$ | | | | | | |
| 26 | Digitex 1000 | Engelhard Industries | Kaolin-based pigment | | | | | | |
| 27 | Syloid SP500-11007 | Grace-Davison | SiO$_2$ | | | | | | |

Suitable porous polymeric pigments are given in the table below:

| PP-No. | Product name | Producer | Chemical composition | Average particle size [μm] | pH | Pore volume [mL/g] | Pore diameter [nm] | Oil absorption capacity [mL/100 g] |
|---|---|---|---|---|---|---|---|---|
| 28 | Submicron Filler | Nippon Kasei | urea-formaldehyde resin | 1-8# | | | | 500-1000 |
| 29 | Micropearl M305 | Matsumoto | PMMA | 4.3 | | 0.45 | | |
| 30 | Covabead LH170 | LCW | PMMA | 7.2 | | 1.7 | | |
| 31 | Sunpmma-PH | Sunjin | PMMA | 8 | | 2.3-2.6 | 17 | 2.2 |
| 32 | Deuteron OG874 | Deuteron | ground polymethylurea | | 8.0 | | | |
| 33 | Pergopak M6 | Albemarle | polymethylurea | 0.3* | | | | |
| 34 | Pergopak HP | Albemarle | polymethylurea | 0.125* | | | | | primary particle size 0.1-0.3 μm

*primary particle size

Porosity can be determined by standard techniques such as nitrogen porosimetry, in which nitrogen is condensed in the pores and calculating the pore volumes from the quantities of gas required to fill the pores, and mercury porosimetry, in which liquid mercury is forced into pores by increasing the external pressure, the amount of mercury required to fill the pores being increased incrementally.

Opacifying Pigments

According to a twenty-second embodiment of the printable paper, according to the present invention, the single layer further comprises at least one opacifying pigment.

Suitable opacifying pigments are given in the table below:

| OP-No. | Product name | Producer | Chemical composition | Average particle size [μm] | pH | Pore volume [mL/g] | Pore diameter [nm] | Oil absorption capacity [mL/100 g] | Surface treatment |
|---|---|---|---|---|---|---|---|---|---|
| 01 | SpaceRite S-11 | Almatis | Al(OH)$_3$ | 0.25-0.31 | 9.8 | | | 24-28 | |
| 02 | Pural BT | Sasol | Al(OH)$_3$ | 5 | | | | | |
| 03 | Carbital 110 | Zinchem | CaCO$_3$ | 2 | | | | | |
| 04 | Carbital 120 | Zinchem | CaCO$_3$ | 5 | | | | | |
| 05 | Jetcoat 30 | Specialty Minerals | CaCO$_3$ slurry | | 7.0 | | | | |
| 06 | VPR350ME | SA Omya Benelux | CaCO$_3$ anionic slurry | | 6.5 | | | | |
| 07 | China Clay Pigment ASP200 | Engelhard Industries | China Clay | 0.4 | 3.5-5.0 | | | | |
| 08 | China Clay Grade B | Zinchem | China Clay | 2 | | | | | |
| 09 | Snowtex | Nissan Chemical | colloidal SiO$_2$ | 10-20 nm | 9.0-10.5 | | | | |
| 10 | Hydragloss 90 | J. M. Huber | fine glossing coating clay | | | | | | |
| 11 | ArtNo.. 102143 | Merck | Ca$_5$(PO$_4$)$_3$OH | | | | | | |
| 12 | VITOSS | Orthovita | Ca$_3$(PO$_4$)$_2$ | 0.1* | | | | | |
| 13 | Kronos 2059 | Kronos | TiO$_2$ | | 7.0 | | | 18-21 | |
| 14 | Ti Pure R900 | Du Pont | TiO$_2$ | 4 | 7.3 | | | | |
| 15 | Finntitan RD5 | Keyser & Mackay | TiO$_2$ | 0.21 | 7.5 | | | 19 | |

Water-Soluble Binder

According to a twenty-third embodiment, of the printable paper, according to the present invention, the single layer further comprises at least one water-soluble binder.

According to a twenty-fourth embodiment, of the printable paper, according to the present invention, the water-soluble binder is a hydrolyzed polymer or copolymer of a vinylester.

According to a twenty-fifth embodiment, of the printable paper, according to the present invention, the water-soluble binder is a hydrolyzed polymer or copolymer of vinyl acetate, with a degree of hydrolysis of at least 85% being preferred, and a degree of hydrolysis of at least 87% being particularly preferred.

Suitable water-soluble binders include the hydrolyzed polyvinyl acetates given in the table below.

| | Product name | Producer | Degree of hydrolysis [mol %] | Residual acetyl (Vinyl acetate) content [wt %] |
|---|---|---|---|---|
| B01 | Erkol 48 20 | ACETEX | 97.5-99.5 | |
| B02 | Mowiol 10-74 | Kuraray Specialties Europe (KSE) | 74 | |
| B03 | Airvol 350 | Air Products | 97.5-99.5 | |
| B04 | Airvol 540 | Air Products | 87-88 | |
| B05 | Mowiol 15-79 | KSE | 81.5 | 15.4 |
| B06 | Mowiol 3-83 | KSE | 82.6 | 14.6 |
| B07 | Mowiol 4-88 | KSE | 87.7 | 10.8 |
| B08 | Mowiol 5-88 | KSE | 87.7 | 10.8 |
| B09 | Mowiol 8-88 | KSE | 87.7 | 10.8 |
| B10 | Mowiol 18-88 | KSE | 87.7 | 10.8 |
| B11 | Mowiol 23-88 | KSE | 87.7 | 10.8 |
| B12 | Mowiol 26-88 | KSE | 87.7 | 10.8 |
| B13 | Mowiol 40-88 | KSE | 87.7 | 10.8 |
| B14 | Mowiol 47-88 | KSE | 87.7 | 10.8 |
| B15 | Mowiol 30-92 | KSE | 92.4 | 6.9 |
| B16 | Mowiol 3-96 | KSE | 97.2 | 2.7 |
| B17 | Mowiol 3-98 | KSE | 98.4 | 1.5 |
| B18 | Mowiol 6-98 | KSE | 98.4 | 1.5 |
| B19 | Mowiol 10-98 | KSE | 98.4 | 1.5 |
| B20 | Mowiol 20-98 | KSE | 98.4 | 1.5 |
| B21 | Mowiol 56-98 | KSE | 98.4 | 1.5 |
| B22 | Mowiol 28-99 | KSE | 99.4 | 0.6 |
| B23 | Poval PVA 203 | Kuraray | 88.0 | |
| B24 | Poval PVA 205 | Kuraray | 87.8 | |
| B25 | Poval PVA 217 | Kuraray | 88.0 | |
| B26 | Poval PVA 220 | Kuraray | 88.0 | |
| B27 | Poval PVA 224 | Kuraray | 88.0 | |
| B28 | Poval PVA 226 | Kuraray | 87.5 | |
| B29 | Poval PVA 235 | Kuraray | 88.0 | |
| B30 | Poval PVA 403 | Kuraray | 80.0 | |
| B31 | Poval PVA 405 | Kuraray | 81.5 | |
| B32 | Poval PVA 420 | Kuraray | 79.5 | |
| B33 | Poval PVA CST | Kuraray | 96.0 | |
| B34 | Poval PVA 613 | Kuraray | 93.5 | |
| B35 | Poval PVA 624 | Kuraray | 95.5 | |

-continued

|  |  |  | Degree of hydrolysis [mol %] | Residual acetyl (Vinyl acetate) content [wt %] |
|---|---|---|---|---|
| B36 | Poval PVA 706 | Kuraray | 91.5 |  |
| B37 | Poval PVA 103 | Kuraray | 98.5 |  |
| B38 | Poval PVA 105 | Kuraray | 98.5 |  |
| B39 | Poval PVA 110 | Kuraray | 98.5 |  |
| B40 | Poval PVA 117 | Kuraray | 98.5 |  |
| B41 | Poval PVA 124 | Kuraray | 98.5 |  |

Hardened Polyhydroxy-Resin

According to a twenty-sixth embodiment, of the printable paper, according to the present invention, the single layer further comprises at least one hardened initially water-soluble polyhydroxy resin.

According to a twenty-seventh embodiment of the present invention, the single layer further contains a hardened hydrolyzed polymer or copolymer of a vinyl ester e.g. by the hardening of POVAL R1130, a silanol modified polyvinyl alcohol.

Suitable water-soluble polyhydroxy resins include hydrolyzed polymers or copolymers of a vinylester; cellulose and cellulose derivatives; polysaccharides; and polyalkylene glycols.

Suitable hardeners include polyisocyanates, hydrolyzed polyalkoxysilanes e.g. tetraalkyl orthosilicates.

Insolubilization Agents

Insolubilization is a process in which either a solublization process is reversed e.g. by pH reduction if a pH-change brings about solublization e.g. by conversion of a carboxy group into a carboxylate ion e.g. by acidification or simple evaporation of ammonia if ammonium hydroxide is used to realize the solubilization. Such solubilization can apply to a latex or to a dispersing agent stabilizing a latex dispersion. Alternatively insolublization can be the addition of an insolubilizing agent such as formaldehyde, glutaraldehyde, glyoxal, glyoxal-derivatives, dimethylol urea, polyanionic metallic compounds (see GB 2177413A at page 2, line 5) and melamine-formaldehyde resins and carboxylic acid anhydrides which contain a plurality of anhydride moieties on each molecular entity (see U.S. Pat. No. 6,300,393). These insolubilization agents can catalyze, initiate a reaction with, complex with, cure or otherwise react with the species being insolubilized. Moreover, the insolubilizing agent may require activation in order for it to acquire insolubilizing properties e.g. by heating, exposure to electromagnetic radiation e.g. light, X-rays, electron beams etc., a change in pH or any other means.

According to a twenty-eighth embodiment of the printable paper, according to the present invention, the single layer further comprises at least one insolubilizing agent unless said latex is solubilized with ammonium hydroxide.

According to a twenty-ninth embodiment of the printable paper, according to the present invention, the single layer further comprises at least one insolubilizing agent selected from the group consisting of: polyisocyanates, formaldehyde, formaldehyde derivatives, glutaraldehyde, glyoxal, glyoxal-derivatives, dimethylol urea, polyanionic metallic compounds and melamine-formaldehyde resins, polyalkoxysilanes (e.g. tetraalkyl orthosilicates), and carboxylic acid anhydrides which contain a plurality of anhydride moieties on each molecular entity.

Suitable insolubilizing agents include:

| | |
|---|---|
| IN01: | Bayhydur 3100, a hydrophilic aliphatic isocyanate based on hexamethylene diisocyanate (HDI from Bayer |
| IN02: | Parez Resin 707, a dimethylol trimethylolmelamine formaldehyde resin from Am Cyanamid |
| IN03: | Irgacure 500, a hydrophilic aliphatic isocyanate based on hexamethylene diisocyanate (HDI from Bayer |
| IN04: | Bayhydur XP2547, a hydrophilic aliphatic isocyanate based on hexamethylene diisocyanate (HDI from Bayer |
| IN05: | Irgacure 819DW, a UV-initiator from CIBA |
| IN06: | Irgacure 500, a UV-initiator from CIBA |
| IN07: | Berset ® 2115*, a glyoxal-based reactant as a light straw-coloured liquid (46-48 wt %) from Bercen, Inc. |
| IN08: | Berset ® 2116*, a glyoxal-based reactant as a clear straw-coloured liquid (49-51 wt %) from Bercen, Inc. |
| IN09: | Berset ® 2125*, a glyoxal-based reactant as a light straw-coloured liquid (67-69 wt %) from Bercen, Inc. |
| IN10: | Berset ® 2185*, a glyoxal-based reactant from Bercen, Inc. |
| IN11: | Berset ® 2506*, a melamine-formaldehyde resin as a clear to slightly hazy liquid (69-71 wt %) from Bercen, Inc. |
| IN12: | Berset ® 2700*, a cyclic amide condensate as a clear amber solution (44-46 wt %) from Bercen, Inc. |
| IN13: | Berset ® 2720*, a ammonium zirconium carbonate as a clear to slightly hazy solution (30.5-33.5 wt %)# from Bercen, Inc. |
| IN14: | Berset ® 2750*, a potassium zirconium carbonate as a clear to slightly hazy solution (45-50 wt %) from Bercen, Inc. |

*supplied by
also available from Magnesium Elektron Ltd., Twickenham, England.

Matting Agents

According to a thirtieth embodiment of the printable paper, according to the present invention, the single layer further comprises a matting agent.

Suitable matting agents are given in the table below:

| | |
|---|---|
| MA01: | a 7-8 µm grafted polymethylmethacrylate matting agent |
| MA02: | a 3-12 µm polyethylene wax |
| MA03: | Syloid C907, 7 µm silica particles from Grace-Davison |
| MA04: | Pergopak M, 6-20 µm polymethylurea particles from Albemarle |
| MA05: | Syloid SP4-9701, 11 µm silica particles from Grace-Davison |

-continued

| | |
|---|---|
| MA06: | PMMA 10, 10 μm polymethylmethacrylate particles from H. W. Sands |
| MA07: | PMMA 10TIGHT, 10 μm crosslinked polymethylmethacrylate particles from H. W. Sands |
| MA08: | EPOSTAR L15, 10-15 μm benzoguanine-melamine/ formaldehyde particles from Nippon Shokubai |
| MA09: | Orgasol 3501 EXD NAT1, 10 μm polyamide particles from Atochem S.A. |
| MA10: | Flo Beads EA209, 10 μm ethylene-acrylic acid copolymer particles from Sumitomo, |
| MA11: | Flo Beads CL2080, 12.5 μm polyethylene particles from Sumitomo |
| MA12: | Tospearl 3120, 12 μm polydimemylsiloxane particles from Toshiba |
| MA15 | a 6 μm grafted polymethylmethacrylate matting agent |

Preservative

According to a thirty-first embodiment of the printable paper, according to the present invention, the single layer further comprises a preservative. The purpose of a preservative is to act as a bactericide and fungicide to prevent the growth of mould.

According to a thirty-second embodiment of the printable paper, according to the present invention, further comprises a salt of 1,2-benzisothiazolin-3-one e.g. the sodium salt of 1,2-benzisothiazolin-3-one commercially available under the trade name "Proxel" and Bronidox K.

Process for Producing a Printable Paper

Aspects of the present invention are realized by a process for producing a printable paper comprising the steps of: (i) optionally providing a water-resistant support having two sides with a subbing layer on at least one side; (ii) providing at least one side of said optionally subbed water-resistant support with a single layer having no substantial compositional variation, said single layer being applied to said optionally subbed water-resistant support as at least one wet aqueous layer in a single pass for each side of said water-resistant support, said at least one aqueous layer comprising at least one latex, at least one pigment, at least one binder and optionally at least one insolubilizing agent, wherein said latex is an anionic acrylic latex or an aliphatic polyurethane latex.

Industrial Application

Non-transparent microvoided axially stretched films, according to the present invention, can be used as synthetic paper for printing and other applications, as a relector in LCD displays and photovoltaic devices, as a support for imaging materials e.g. impact and non-impact (e.g. electrophotography, electrography and ink jet) receiving materials, photothermographic recording materials, substantially light-insensitive thermographic recording materials, dye sublimation printing, thermal transfer printing, etc., in security and anti-counterfeiting applications e.g. in tickets, labels, tags, an ID-card, a bank card, a legal document, banknotes and packaging and can also be integrated into packaging.

The invention is illustrated hereinafter by way of comparative examples and examples. The percentages and ratios given in these examples are by weight unless otherwise indicated. Ingredients Used in the Examples and Comparative Examples:

Slipping Agents:
SL01: Tegoglide 482 a 65% by weight aqueous emulsion of a high molecular weight polydimethylsiloxane surfactant from Goldschmidt Surfactants:
S01: Synperonic 91/5, an alcohol ethoxylate with the composition $C_{9-11}H_{19-23}O-(C_2H_4O)_5H$ from Uniqema;
S02: MERSOLAT®H, a sodium pentadecylsulfonate from BAYER;
S03: ULTRAVON®W, a sodium arysulfonate from CIBA [UVONAC];
S04: DR247
S05: Arkopon T, a sodium salt of N-methyl-N-2-sulfoethyl-oleylamide supplied as a 40% concentrate by Avecia [OTIK];
S06: Envirogem AE01 a 100% mixture of esters from Air Products
S07: Zonyl FSO100 a mixture of ethoxylated non-ionic fluoro-surfactant from DuPont with the formula:

$F(CF_2CF_2)_{1-7}CH_2CH_2-O-(CH_2CH_2O)_yH$ where y=0 to ca. 15 from DuPont

Polyester:

| PET-No. | | | MFI 270° C./ 1.20 kg [cm³/10 min] | Inherent viscosity** [η] [dl/g] | $T_g$ [° C.] |
|---|---|---|---|---|---|
| 01 | T03* | polyethylene terephthalate | 34.8 | 0.60 | 80.5 |
| 02 | T04* | polyethylene terephthalate | 34.8 | 0.60 | 80.5 |
| 03 | WP75# | polyester of 98.5 mol % terephthalate, 1.5 mol % isophthalate and 100 mol % ethylene units | | 0.77 | 80 |
| 04 | DP9990# | polyester of 90 mol % terephthalate, 10 mol % isophthalate and 100 mol % ethylene units | | 0.60 | |

*AGFA-GEVAERT N.V.
La Seda
**inherent viscosity was determined in a 0.5 g/dL solution of 60 wt % phenol and 40 wt % ortho-dichlorobenzene at 25° C. in an Ubbelohde viscometer Styrene-Acrylonitrile Copolymers:

| SAN-No. | | Wt % acrylo-nitrile | Wt % styrene | MFI at 270° C./1.20 kg [mL/10 min] | Mn | Mw | $T_g$ [° C.] |
|---|---|---|---|---|---|---|---|
| 01 | TYRIL 905* | 20 | 80 | 7.1 | | | 105.2 |
| 02 | TYRIL 867E* | 25 | 75 | 5.8 | | | 106.5 |
| 03 | SAN 140* | 27.5 | 72.5 | 53.2 | 47,640 | 99,820 | 108.8 |
| 04 | LURAN 368R# | 28 | 72 | 3.9 | | | 107.3 |
| 05 | TYRIL 790* | 29 | 71 | 12.1 | | | 106.3 |
| 06 | SAN 124* | 28.5 | 71.5 | 37.9 | 53,940 | 109,350 | 108.1 |
| 07 | LURAN 388S# | 33 | 67 | 3.6 | | | 108.7 |

*DOW CHEMICAL
BASF
MFI = Melt Flow Index

TITANIUM DIOXIDE: Renol-white/PTX 506, a masterbatch from CLARIANT GmbH containing 65% by weight $TiO_2$ and 35 wt % polyester TPX DX820: a high rigidity isotactic poly(4-methyl-1-pentene) from MITSUI CHEMICAL Examples 1 and 2

Production of Subbed Supports

A ca. 1100 μm thick extrudate with the composition given in Table 1 below was biaxially stretched according to the conditions given in Table 2 to provide a non-transparent microvoided biaxially stretched self-supporting film with a thickness of 150 μm.

TABLE 1

| EXAMPLE No. | IPA:TPA ratio | PET02 [wt %] | PET04 [wt %] | SAN 06 [wt %] | $TiO_2$ [wt %] | TPX 820 [wt %] | UVITEX OB-one [wt %] |
|---|---|---|---|---|---|---|---|
| 1 | 0.0769 | 23.734 | 59.30 | 15.00 | 1.95 | — | 0.0260 |
| 2 | 0.0769 | 23.613 | 59.00 | 14.92 | 1.945 | 0.497 | 0.0259 |

TABLE 2

| | Longitudinal stretching | | | Transversal stretch | | |
|---|---|---|---|---|---|---|
| EXAMPLE No. | force ratio | [N/mm²] | temperature [° C.] | ratio | speed [%/min] | Density [g/mL] |
| 1/LS1/BS1 | 3.3 | 12 | 110 | 3.5 | 1000 | 1.2 |
| 2/LS1/BS1 | 3.3 | 12 | 110 | 3.5 | 1000 | 1.2 |

The non-transparent microvoided biaxially stretched self-supporting films 1/LS1/BS1 and 2/LS1/BS1 were then subbed with subbing layers 1, a non-antistatic layer, subbing layer 2, an antistatic subbing layer composition, subbing layer 3, an antistatic subbing layer composition, subbing layer 4, a non-antistatic layer composition or subbing layer 5, an antistatic layer composition, on one or both sides of the support:

Subbing Layer 1:

| | coverage in dried layer [mg/m²] |
|---|---|
| copolymer of 88% vinylidene chloride, 10% methyl acrylate and 2% itaconic acid | 79.1 |
| Kieselsol ® 100F, a colloidal silica from BAYER | 18.6 |
| Surfactant No. 2, an anionic surfactant | 0.4 |
| Surfactant No. 3, an anionic surfactant | 1.9 |

Subbing Layer 2:

| | coverage in dried layer [mg/m²] |
|---|---|
| poly(3,4-ethylenedioxythiophene)/polystyrene sulphonic acid (1:2.46 by weight) | 2.58 |
| Bronidox K | 0.02 |
| copolymer of 88% vinylidene chloride, 10% methyl acrylate and 2% itaconic acid stabilized with surfactant S05 | 147.3 |
| Kieselsol ® 100F, a colloidal silica from BAYER | 16.4 |
| sorbitol | [24.7*] |
| Surfactant S02, an anionic surfactant | 0.74 |

*will substantially evaporate/sublime during the drying process

Subbing Layer 3:

| | wt % solids in coating dispersion | coverage in dried layer [mg/m²] |
|---|---|---|
| poly(3,4-ethylenedioxythiophene)/polystyrene sulphonic acid (1:2.46 by weight) | 6.01 | 2.838 |
| sorbitol | 28.06 | [13*] |
| Proxel Ultra 5 | 0.03 | 0.01 |

-continued

|  | wt % solids in coating dispersion | coverage in dried layer [mg/m²] |
|---|---|---|
| Surfactant S01, a non-ionic surfactant | 1.66 | 0.78 |
| a terephthalic acid, isophthalic acid, 5-sulfo-isophthalic acid, ethylene glycol (53:40:7:100 molar ratio) copolyester | 64.24 | 30.2 |

*will substantially evaporate/sublime during the drying process

Subbing Layer 4:

|  | coverage in dried layer [mg/m²] |
|---|---|
| copolymer of 88% vinylidene chloride, 10% methyl acrylate and 2% itaconic acid stabilized with surfactant S05 | 80.85 |
| Kieselsol ® 100F, a colloidal silica from BAYER | 18.75 |
| Surfactant S02, an anionic surfactant | 0.4 |

Subbing Layer 5:

|  | wt % solids in coating dispersion | coverage in dried layer [mg/m²] |
|---|---|---|
| poly(3,4-ethylenedioxythiophene)/ polystyrene sulphonic acid (1:2.46 by weight) | 1.30 | 4.69 |

|  | wt % solids in coating dispersion | coverage in dried layer [mg/m²] |
|---|---|---|
| copolymer of 88% vinylidene chloride, 10% methyl acrylate and 2% itaconic acid stabilized with surfactant S05 | 82.16 | 294.54 |
| Kieselsol 100F-30, a colloidal silca from BAYER | 9.13 | 32.72 |
| Surfactant S02, an anionic surfactant | 0.30 | 0.11 |
| glucose | 6.94 | [24.9*] |
| Proxel Ultra 5 | 0.005 | 0.03 |
| sorbitol | 0.16 | [0.57*] |

*will substantially evaporate/sublime during the drying process

Optimalization of the Receiving Layer Composition

Example 3

Screening of Different Latexes

The non-transparent microvoided biaxially stretched self-supporting films 1/LS1/BS1 coated with subbing layer 1 was coated with the compositions in Table 3 in the case of EXAMPLES 3/1 to 3/3 together with small quantities of Tego Glide 482, a high molecular weight polydimethylsiloxane from Goldschmidt, and the surfactant S04; in the case of EXAMPLES 3/4 to 3/8 just with quantities of the surfactant S04; in the case of EXAMPLES 3/9 to 3/19 with a mixture of two surfactants (S04 and S05); in the case of EXAMPLES 3/20 to 3/28 with a mixture of two surfactants (S05 and S06); in the case of EXAMPLES 3/26; in the case of EXAMPLES 3/27 to 3/31 without further additives; and in the case of EXAMPLES 3/32 to 3/38 with a mixture of two surfactants (S05 and S06).

TABLE 3

| Example No. | Porous pigment No. | coverage [mg/m²] | Latex No. | coverage [g/m²] | Wt ratio porous pigment to latex | ballpen writability | printing properties dry time [min] | set-off | mottle |
|---|---|---|---|---|---|---|---|---|---|
| 3/1 | PP21 | 760 | 01 | 2000 | 0.380 | repulsion in centre | | | |
| 3/2 | PP21 | 760 | PAZ | 2000 | 0.380 | v. good | | | |
| 3/3 | PP21 | 760 | 02 | 2000 | 0.380 | good | | | |
| 3/4 | PP21 | 762 | 01 | 2031 | 0.375 | good | | | |
| 3/5 | PP21 | 762 | 02 | 2031 | 0.375 | repulsion in centre | | | |
| 3/6 | PP21 | 762 | MS16826 | 2031 | 0.375 | good | 5 | no | |
| 3/7 | PP21 | 762 | MS5291 | 2031 | 0.375 | repulsion in centre | | | |
| 3/8 | PP21 | 762 | L23 | 2031 | 0.375 | — | 5 | no | |
| 3/9 | PP21 | 762 | 01 | 2031 | 0.375 | repulsion in centre | | strong | yes |
| 3/10 | PP21 | 2031 | 01 | 2031 | 1.00 | good | | no | slight |
| 3/11 | PP21 | 1500 | 01 | 2031 | 0.739 | moderate density | | no | slight |
| 3/12 | PP21 | 762 | L24 | 2031 | 0.375 | v. moderate density | | yes | strong |
| 3/13# | PP21 | 1500 | L24 | 2031 | 0.739 | good | | no | slight |
| 3/14 | PP21 | 762 | L23 | 2031 | 0.375 | repulsion in centre | | no | slight |
| 3/15# | PP21 | 1500 | L23 | 2031 | 0.739 | repulsion in centre | | no | no |
| 3/16 | PP21 | 762 | 04 | 2031 | 0.375 | repulsion in centre | | strong | yes |
| 3/17 | PP21 | 1500 | 04 | 2031 | | v. good | | yes | yes |
| 3/18 | PP21 | 762 | 05 | 2031 | 0.375 | repulsion in centre | | strong | yes |
| 3/19 | PP21 | 1500 | 05 | 2031 | 0.739 | repulsion in centre | | no | no |

TABLE 3-continued

| Example No. | Porous pigment No. | coverage [mg/m²] | Latex No. | coverage [g/m²] | Wt ratio porous pigment to latex | ballpen writability | printing properties dry time [min] | set-off | mottle |
|---|---|---|---|---|---|---|---|---|---|
| 3/20 | PP21 | 990 | 01 | 2010 | 0.491 | repulsion in centre | | slight | yes |
| 3/21* | PP21 | 990 | L23 | 2010 | 0.491 | | | no | slight |
| 3/22 | PP21 | 990 | 06 | 2010 | 0.491 | | | slight | yes |
| 3/23 | PP21 | 990 | 07 | 2010 | 0.491 | | | slight | yes |
| 3/24 | PP21 | 1500 | MS60054 | 2031 | 0.739 | | | yes | yes |
| 3/25 | PP21 | 762 | 05 | 2031 | 0.375 | | | yes | slight |
| 3/26 | PP21 | 1500 | 05 | 2031 | 0.739 | | | no | |
| 3/27## | PP21 | | B01 | | | | | no | slight |
| 3/28** | PP21 | | B01 | | | | | no | no |
| 3/29*** | PP21 | | B01 | | | | | no | no |
| 3/30# | PP21 | 750 | MS16357 | 2000 | 0.375 | | | | yes |
| 3/31# | PP21 | 1500 | MS16357 | 2000 | 0.750 | | | | no |
| 3/32 | PP21 | 750 | CP3077 | 2000 | 0.375 | | | yes | no |
| 3/33 | PP21 | 750 | CE1611 | 2000 | 0.375 | | | yes | slight |
| 3/34 | PP21 | 1500 | CE1611 | 2000 | 0.750 | | | yes | no |
| 3/35 | PP21 | 1000 | 08 | 2000 | 0.500 | | | slight | yes |
| 3/36 | PP21 | 1000 | 09 | 2000 | 0.500 | | | slight | yes |
| 3/37 | PP21 | 1000 | 10 | 2000 | 0.500 | | | strong | yes |
| 3/38**** | PP21 | 1000 | 10 | 2000 | 0.500 | | | v. strong | no | poor adhesion
*not scratch-resistant
PAZ = MS16686
hardened with 100% glyoxal at pH 4
**hardened with 50% tetramethyl orthosilicate at pH 4
***hardened with 100% tetramethyl orthosilicate at pH 4
****hardened with 0.999 g/m² MS15262 MS16357 POVAL R1130

A lack of adhesion between the support and the single layer is remediable by adapting the modifying the subbing layer or by providing a subbing layer comprising the plurality of subbing layers required to realize adhesion between the support and the single layer.

Example 4

Screening of Different Latexes

The non-transparent microvoided biaxially stretched self-supporting films 1/LS1/BS1 coated with subbing layer 3 was coated with the compositions in Table 4 with 0.04 g/m² of the surfactant S07.

TABLE 4

| Example No. | Porous pigment No. | coverage [g/m²] | Latex No. | coverage [g/m²] | Wt ratio porous pigment to latex | Binder No. | coverage [g/m²] |
|---|---|---|---|---|---|---|---|
| 4/1 | PP21 | 1.5 | L04 | 2.0 | 0.75 | — | — |
| 4/2 | PP21 | 2.0 | L04 | 2.0 | 1.0 | — | — |
| 4/3 | PP21 | 2.0 | L04 | 2.0 | 1.0 | B01 | 0.2 |
| 4/4 | PP21 | 1.5 | L32 | 2.0 | 0.75 | — | — |
| 4/5 | PP21 | 2.0 | L32 | 2.0 | 1.0 | — | — |
| 4/6 | PP21 | 2.0 | L32 | 2.0 | 1.0 | B01 | 0.2 |
| 4/7 | PP21 | 1.5 | L20 | 2.0 | 0.75 | — | — |
| 4/8 | PP21 | 2.0 | L20 | 2.0 | 1.0 | — | — |
| 4/9 | PP21 | 2.0 | L20 | 2.0 | 1.0 | B01 | 0.2 |
| 4/10 | PP21 | 1.5 | L19 | 2.0 | 0.75 | — | — |
| 4/11 | PP21 | 2.0 | L19 | 2.0 | 1.0 | — | — |
| 4/12 | PP21 | 2.0 | L19 | 2.0 | 1.0 | B01 | 0.2 |
| 4/13 | PP21 | 1.5 | L22 | 2.0 | 0.75 | — | — |
| 4/14 | PP21 | 2.0 | L22 | 2.0 | 1.0 | — | — |
| 4/15 | PP21 | 2.0 | L22 | 2.0 | 1.0 | B01 | 0.2 |
| 4/16 | PP21 | 2.0 | L04 | 2.0 | 1.0 | B01 | 0.2 |
| 4/17 | PP21 | 2.0 | L04 | 2.0 | 1.0 | B01 | 0.2 |
| 4/18 | PP21 | 1.5 | 04 | 2.0 | 0.75 | — | — |
| 4/19 | PP21 | 2.0 | 04 | 2.0 | 1.0 | — | — |
| 4/20 | PP21 | 2.0 | 04 | 2.0 | 1.0 | B01 | 0.2 |
| 4/21 | PP21 | 1.5 | L16 | 2.0 | 0.75 | — | — |
| 4/22 | PP21 | 2.0 | L16 | 2.0 | 1.0 | — | — |
| 4/23 | PP21 | 2.0 | L16 | 2.0 | 1.0 | B01 | 0.2 |
| 4/24 | PP21 | 1.5 | L17 | 2.0 | 0.75 | — | — |
| 4/25 | PP21 | 2.0 | L17 | 2.0 | 1.0 | — | — |
| 4/26 | PP21 | 2.0 | L17 | 2.0 | 1.0 | B01 | 0.2 |
| 4/27 | PP21 | 1.5 | L18 | 2.0 | 0.75 | — | — |
| 4/28 | PP21 | 2.0 | L18 | 2.0 | 1.0 | — | — |
| 4/29 | PP21 | 2.0 | L18 | 2.0 | 1.0 | B01 | 0.2 |
| 4/30* | PP21 | 2.2 | L21 | 2.14 | 0.973 | B01 | 0.22 |

*MMA01 in concentration of 0.1 g/m²

Printing tests were carried out on a Heidelberg GT046 printing press with a K+E800 ink and as fountain 4% AGFA FS330 with 10% isopropanol. The results of qualitative printability tests are summarized in Table 5.

TABLE 5

| Example No. | Latex | Wt ratio porous pigment to latex | ballpen writability | Printing tests Tape test dry [10 min] | mottle | Dot gain 50% screen | IGT tests drying time to avoid set-off [s] |
|---|---|---|---|---|---|---|---|
| 4/1 | L04 | 0.75 | repulsion in centre | OK | yes | 24 | >58 |
| 4/2 | L04 | 1.0 | repulsion in centre | cohesive break | no | 25 | 48 |
| 4/3 | L04 | 1.0 | repulsion in centre | OK | no | 25 | 31 |
| 4/4 | L32 | 0.75 | repulsion in centre | OK | yes | 26 | 31 |
| 4/5 | L32 | 1.0 | repulsion in centre | OK | slight | 25 | 31 |
| 4/6 | L32 | 1.0 | good | OK | no | 25 | 9 |
| 4/7 | L20 | 0.75 | repulsion in centre | cohesive break | yes | 26 | |
| 4/8 | L20 | 1.0 | repulsion in centre/cracking | delaminates | yes | 25 | |
| 4/9 | L20 | 1.0 | repulsion in centre/ cracking | OK | yes | 24 | |
| 4/10 | L19 | 0.75 | good | delaminates | | | |
| 4/11 | L19 | 1.0 | good | delaminates | | | |
| 4/12 | L19 | 1.0 | repulsion in centre | delaminates | | | |
| 4/13 | L22 | 0.75 | repulsion in centre/ cracking | OK | | | |
| 4/14 | L22 | 1.0 | repulsion in centre | cohesive break | | | |
| 4/15 | L22 | 1.0 | repulsion in centre | OK | | | |
| 4/16 | L04 | 1.0 | | OK | no | 25 | |
| 4/17 | L04 | 1.0 | | OK | no | 26 | |
| 4/18 | 04 | 0.75 | | OK | strong | 29 | |
| 4/19 | 04 | 1.0 | | slight cohesive break | strong | 27 | |
| 4/20 | 04 | 1.0 | | OK | no | 27 | |
| 4/21 | L16 | 0.75 | | OK | slight | 28 | |
| 4/22 | L16 | 1.0 | | strong cohesive break | no | 26 | |
| 4/23 | L16 | 1.0 | | slight cohesive break | no | 25 | |
| 4/24 | L17 | 0.75 | | delaminates | slight | 29 | |
| 4/25 | L17 | 1.0 | | delaminates | strong | 27 | |
| 4/26 | L17 | 1.0 | | OK | slight | 27 | |
| 4/27 | L18 | 0.75 | | delaminates | strong | 27 | |
| 4/28 | L18 | 1.0 | | delaminates | no | 27 | |
| 4/29 | L18 | 1.0 | | strong cohesive break | no | 27 | |
| 4/30* | L21 | 0.973 | | OK | no | 27 | |

*Linimark evaluation of scratch resistance carried out with a Roberta apparatus gave a force before scratching was observed of 31 mN Table 6 summarize the findings of EXAMPLES 3 and 4 in respect of the choice of latex for use in the single layer coated on at least on side of an optionally subbed support.

TABLE 6

| latex No. | | | |
|---|---|---|---|
| 01 | Joncryl FLX5000 | BASF | REFERENCE; pH 8.5; poor mottle; no alkali resistance; water resistant [fensterklar] |
| 02 | Joncryl 8078 | BASF | cf. FLX 5000; pH 8.3; ammonia-neutralized; poor mottle; non alkali-resistant; poorer drying than REF; poor adhesion |

TABLE 6-continued

| latex No. | | | |
|---|---|---|---|
| 03 | Joncryl FLX5010 | BASF | pH 8.5; better alkali-resistance; poor mottle; water resistant |
| 04 | Joncryl 8050 | BASF | cf. FLX 5000; pH 7.8; partially neutralized resin; with as emulsifier a low-molecular-weight alkali-soluble styrene/acrylate copolymer; poor mottle; non alkali-resistant |
| 05 | Hycar PC84 | Dow Chemical | pH 6.0; cf. FLX 5000; poor mottle; non alkali-resistant; self-crosslinking |
| 06 | Carboset GA2364 | Goodrich | PH 5.5, 6.5; cf. FLX 5000; poor mottle; non alkali-resistant |
| 07 | Joncryl 8385 | BASF | pH 7.9; self-crosslinking; cf. FLX 5000; poor mottle; no alkali resistance |
| 08 | Enorax PU950 | Collano | pH 4.5; very good (better than FLX 5000); no longer commercially available |
| 09 | wac-17XC | Takamatu Oil & Fat Co. Ltd | pH 7, 9; cf. FLX 5000; poor mottle; no alkali resistance |
| 10 | Crom-elastic C4480 | Cromogenia-units S.A. | pH 8.3; cf. FLX 5000; better mottle; no alkali resistance |
| 11 | Mowilith DM 2452 | Clariant | pH 5, 7; cf. FLX 5010; no alkali resistance |
| 12 | Wellpur FM10C | Van Camp Chemicals | pH 4, 6; no mottle; alkali resistant; layer appears flocked; rough to touch |
| 13 | Neorez R989 | Avecia | pH 8.3; cf. FLX 5000; no alkali resistance; mottle better |
| 14 | Jetsize CE225 | Eka Nobel | cf. FLX 5010; better alkali-resistance; poor mottle |

Example 5

Screening of Different Porous Pigments

The non-transparent microvoided biaxially stretched self-supporting films 1/LS1/BS1 coated with subbing layer 1 was coated with the compositions in Table 7 in the case of EXAMPLES 5/1 to 5/15 together with small quantities of Tego Glide 482, a high molecular weight polydimethylsiloxane from Goldschmidt, and surfactant S04; in the case of EXAMPLES 5/16 to 5/xx with Example 6

Screening of Different Porous Pigments

The non-transparent microvoided biaxially stretched self-supporting films 1/LS1/BS1 coated with subbing layer 3 was coated with the compositions in Table 8 with in the case of EXAMPLES 6/1 to 6/38 with a mixture of two surfactants (S05 and S06).

TABLE 7

| Example No. | Porous pigment | | Latex | | Wt ratio porous pigment to latex | printing properties | | |
|---|---|---|---|---|---|---|---|---|
| | No. | coverage [mg/m$^2$] | No. | coverage [g/m$^2$] | | ballpen writ-ability | dry time set-off [min] | mottle |
| 5/1 | PP21 | 76 | 01 | 203 | 0.374 | repulsion in centre | | |
| 5/2 | — | — | 01 | 203 | — | no | | |
| 5/3 | PP13 | 76 | 01 | 203 | 0.374 | good | | |
| 5/4 | OP03 | 76 | 01 | 203 | 0.374 | v. poor | | |
| 5/5 | OP04 | 76 | 01 | 203 | 0.374 | poor | | |
| 5/6 | OP07 | 76 | 01 | 203 | 0.374 | poor | | |
| 5/7 | OP08 | 76 | 01 | 203 | 0.374 | poor | | |
| 5/8 | OP11 | 76 | 01 | 203 | 0.374 | good | | |
| 5/9 | PP21 | 760 | 01 | 2000 | 0.380 | repulsion in centre | | |
| 5/10 | PP21 | 1500 | 01 | 2000 | 0.750 | repulsion in centre | | |
| 5/11 | PP21 | 2000 | 01 | 2000 | 1.00 | denser but repulsion in centre | 5 | no |
| 5/12 | OP13 | 760 | 01 | 2000 | 0.380 | no | | |
| 5/13 | PP21 | 375 | 01 | 2000 | 0.188 | v. poor | | |
| | OP13 | 375 | | | 0.188 | | | |
| 5/14 | OP13 | 760 | 01 | 2000 | 0.380 | v. poor | | |

TABLE 8

| Example No. | Porous pigment No. | Porous pigment coverage [g/m²] | Latex No. | Latex coverage [g/m²] | Wt ratio porous pigment to latex | Binder No. | Binder coverage [g/m²] |
|---|---|---|---|---|---|---|---|
| 6/1 | PP21 | 1.5 | L05 | 2.0 | 0.75 | — | — |
| 6/2 | PP21 | 0.75 | L05 | 2.0 | 0.375 | — | — |
| 6/3 | PP21 | 0.75 | L05 | 2.0 | 0.375 | — | — |
|  | OP06 | 0.25 |  |  |  |  |  |
| 6/4 | PP21 | 0.75 | L05 | 2.0 | 0.375 | — | — |
|  | OP06 | 0.50 |  |  |  |  |  |
| 6/5 | PP21 | 0.75 | L05 | 2.0 | 0.375 | — | — |
|  | OP06 | 0.75 |  |  |  |  |  |
| 6/6 | OP06 | 0.75 | L05 | 2.0 | — | — | — |
| 6/7 | OP06 | 0.25 | L05 | 2.0 | — | — | — |
| 6/8 | PP21 | 1.5 | L01 | 2.0 | 0.75 | — | — |
| 6/9 | PP21 | 2.0 | L01 | 2.0 | 1.0 | — | — |
| 6/10 | PP01 | 1.5 | L01 | 2.0 | 0.75 | — | — |
| 6/11 | PP01 | 2.0 | L01 | 2.0 | 1.0 | — | — |
| 6/12 | PP02 | 1.5 | L01 | 2.0 | 0.75 | — | — |
| 6/13 | PP02 | 2.0 | L01 | 2.0 | 1.0 | — | — |
| 6/14 | PP21 | 1.0 | L01 | 2.0 | 0.5 | — | — |
| 6/15 | PP21 | 1.5 | L01 | 2.0 | 0.75 | — | — |
| 6/16 | PP21 | 2.0 | L01 | 2.0 | 1.00 | — | — |
| 6/17 | OP01 | 1.0 | L01 | 2.0 | 0.5 | — | — |
| 6/18 | OP01 | 1.5 | L01 | 2.0 | 0.75 | — | — |
| 6/19 | OP01 | 2.0 | L01 | 2.0 | 1.00 | — | — |
| 6/20 | OP02 | 1.0 | L01 | 2.0 | 0.5 | — | — |
| 6/21 | OP02 | 1.5 | L01 | 2.0 | 0.75 | — | — |
| 6/22 | OP02 | 2.0 | L01 | 2.0 | 1.00 | — | — |
| 6/23 | PP28 | 1.0 | L01 | 2.0 | 0.5 | — | — |
| 6/24 | PP28 | 1.5 | L01 | 2.0 | 0.75 | — | — |
| 6/25 | PP28 | 2.0 | L01 | 2.0 | 1.00 | — | — |
| 6/26 | PP21 | 1.5 | L01 | 2.0 | 0.75 | — | — |
| 6/27 | PP21 | 1.0 | L01 | 2.0 | 0.75 | — | — |
|  | PP28 | 0.5 |  |  |  |  |  |
| 6/28 | PP21 | 0.75 | L01 | 2.0 | 0.75 | — | — |
|  | PP28 | 0.75 |  |  |  |  |  |
| 6/29 | PP21 | 0.5 | L01 | 2.0 | 0.75 | — | — |
|  | PP28 | 1.0 |  |  |  |  |  |
| 6/30 | PP28 | 1.5 | L01 | 2.0 | 0.75 | — | — |
| 6/31 | PP21 | 1.0 | L01 | 2.0 | 0.75 | — | — |
|  | PP02 | 0.5 |  |  |  |  |  |
| 6/32 | PP21 | 0.75 | L01 | 2.0 | 0.75 | — | — |
|  | PP02 | 0.75 |  |  |  |  |  |
| 6/33 | PP21 | 0.5 | L01 | 2.0 | 0.75 | — | — |
|  | PP02 | 1.0 |  |  |  |  |  |
| 6/34 | PP02 | 1.5 | L01 | 2.0 | 0.75 | — | — |
| 6/35 | PP21 | 1.5 | L01 | 2.0 | 0.75 | — | — |
| 6/36 | PP15 | 1.5 | L01 | 2.0 | 0.75 | — | — |
| 6/37 | PP12 | 1.5 | L01 | 2.0 | 0.75 | — | — |
| 6/38 | PP28 | 1.5 | L01 | 2.0 | 0.75 | — | — |

Printing tests were carried out on a A.B. Dick D9890 printing press with a K+E800 ink and as fountain 4% Emerald Premium with 10% isopropanol and an IGT Global Standard Tester 2. The results are summarized in Table 9.

TABLE 9

| Example No. | Porous pigments | Weight ratio porous pigment to latex | Printing tests set-off | Printing tests mottle | Dot gain 50% screen | IGT tests penetration test length [mm] | IGT tests penetration test OD | IGT tests time to avoid set-off [s] |
|---|---|---|---|---|---|---|---|---|
| 6/1 | PP21 | 0.75 | no | yes |  |  |  |  |
| 6/2 | PP21 | 0.375 | v. strong | yes |  |  |  |  |
| 6/3 | PP21 OP06 | 0.375 | strong | yes |  |  |  |  |
| 6/4 | PP21 OP06 | 0.375 | yes | yes |  |  |  |  |
| 6/5 | PP21 OP06 | 0.375 | slight | yes |  |  |  |  |
| 6/6 | OP06 | — | very strong | yes |  |  |  |  |
| 6/7 | OP06 | — | yes | yes |  |  |  |  |
| 6/8 | PP21 | 0.75 |  | yes |  | 125.0 |  |  |
| 6/9 | PP21 | 1.0 |  | slight |  | 103.0 |  |  |
| 6/10 | PP01 | 0.75 |  | slight |  | 88.7 |  |  |
| 6/11 | PP01 | 1.0 |  | slight |  | 89.7 |  |  |
| 6/12 | PP02 | 0.75 |  | slight |  | 106.3 |  |  |
| 6/13 | PP02 | 1.0 |  | ca. no |  | 94.3 |  |  |
| 6/14 | PP21 | 0.5 |  | yes |  |  |  |  |
| 6/15 | PP21 | 0.75 |  | yes |  |  |  |  |
| 6/16 | PP21 | 1.00 |  | slight |  |  |  |  |
| 6/17 | OP01 | 0.5 | v. strong | ? |  |  |  |  |
| 6/18 | OP01 | 0.75 | v. strong | ? |  |  |  |  |
| 6/19 | OP01 | 1.00 | v. strong | ? |  |  |  |  |
| 6/20 | OP02 | 0.5 | strong | yes |  |  |  |  |
| 6/21 | OP02 | 0.75 | strong | no |  |  |  |  |
| 6/22 | OP02 | 1.00 | strong | no |  |  |  |  |
| 6/23 | PP28 | 0.5 |  | slight |  |  |  |  |
| 6/24 | PP28 | 0.75 |  | no |  |  |  |  |
| 6/25 | PP28 | 1.00 |  | no |  |  |  |  |
| 6/26 | PP21 | 0.75 | yes | yes |  | 111.0 |  |  |
| 6/27 | PP21 PP28 | 0.75 | yes | no |  | 90.0 |  |  |
| 6/28 | PP21 PP28 | 0.75 | no | no |  | 84.3 |  |  |
| 6/29 | PP21 PP28 | 0.75 | no | no |  | 87.3 |  |  |

TABLE 9-continued

| Example No. | Porous pigments | Weight ratio porous pigment to latex | Printing tests set-off | mottle | Dot gain 50% screen | IGT tests penetration test length [mm] | penetration test OD | time to avoid set-off [s] |
|---|---|---|---|---|---|---|---|---|
| 6/30 | PP28 | 0.75 | no | no | | 76.3 | | |
| 6/31 | PP21 PP02 | 0.75 | no | yes | | 124.3 | | |
| 6/32 | PP21 PP02 | 0.75 | no | slight | | 110.3 | | |
| 6/33 | PP21 PP02 | 0.75 | no | slight | | 108.3 | | |
| 6/34 | PP02 | 0.75 | no | slight | | 104.3 | | |
| 6/35 | PP21 | 0.75 | no | yes | | 121.3 | | |
| 6/36 | PP15 | 0.75 | slight | yes | | 142.0 | | |
| 6/37 | PP12 | 0.75 | slight | yes | | 120.0 | | |
| 6/38 | PP28 | 0.75 | slight | yes | | 131.0 | | |

Replacement of PP21 with PP28 (submicron filler from Nippon Kasei) brings about a reduction in mottle, which is already evident at a coverage of 0.5 g/m$^2$, and also more rapid drying as seen by the strongly reduced penetration length in the results with the IGT Global Standard Tester 2. Replacement of P21 with PP02 (Sunsphere H33) also brings about a reduction in mottle, but less than with PP28.

Example 7

Combination of an Inorganic Porous Pigment and an Organic Polymeric Porous Pigment The non-transparent microvoided biaxially stretched self-supporting films 1/LS1/BS1 coated with subbing layer 3 was coated with the compositions in Table 10 with 0.04 g/m$^2$ of the surfactant S07.

TABLE 10

| Example No. | Porous pigment No. | coverage [g/m$^2$] | Latex No. | coverage [g/m$^2$] | Wt ratio porous pigment to latex | Binder No. | coverage [g/m$^2$] |
|---|---|---|---|---|---|---|---|
| 7/1 | PP21 | 1.5 | L04 | 2.0 | 0.75 | B01 | 0.2 |
| 7/2 | PP21 | 1.75 | L04 | 2.0 | 1.0 | B01 | 0.2 |
| 7/3 | PP21 | 2.0 | L04 | 2.0 | 1.0 | B01 | 0.2 |
| 7/4 | PP21 PP28 | 1.0 0.5 | L04 | 2.0 | 0.75 | B01 | 0.2 |
| 7/6 | PP21 PP28 | 1.5 0.25 | L04 | 2.0 | 0.875 | B01 | 0.2 |
| 7/7 | PP21 PP28 | 1.5 0.5 | L04 | 2.0 | 1.0 | B01 | 0.2 |
| 7/8 | PP21 PP34 | 1.0 0.5 | L04 | 2.0 | 0.75 | B01 | 0.2 |
| 7/10 | PP21 PP34 | 1.5 0.25 | L04 | 2.0 | 0.875 | B01 | 0.2 |
| 7/11 | PP21 PP34 | 1.5 0.5 | L04 | 2.0 | 1.0 | B01 | 0.2 |
| 7/12 | PP21 PP33 | 1.0 0.5 | L04 | 2.0 | 0.75 | B01 | 0.2 |
| 7/14 | PP21 PP33 | 1.5 0.25 | L04 | 2.0 | 0.875 | B01 | 0.2 |
| 7/15 | PP21 PP33 | 1.5 0.5 | L04 | 2.0 | 1.0 | B01 | 0.2 |
| 7/16 | PP21 PP32 | 1.0 0.5 | L04 | 2.0 | 0.75 | B01 | 0.2 |
| 7/18 | PP21 PP32 | 1.5 0.25 | L04 | 2.0 | 0.875 | B01 | 0.2 |
| 7/19 | PP21 PP32 | 1.5 0.5 | L04 | 2.0 | 1.0 | B01 | 0.2 |

Printing tests were carried out on a Heidelberg GT046 printing press with a K+E800 ink and as fountain 4% AGFA FS330 with 10% isopropanol and an IGT Global Standard Tester 2. The results are summarized in Table 11.

TABLE 11

| Example No. | Porous pigments | Weight ratio porous pigment to latex | Printing tests scratch resistance | mottle | Dot gain 50% screen | IGT tests penetration test length [mm] | penetration test OD | time to avoid set-off [s] |
|---|---|---|---|---|---|---|---|---|
| 7/1 | PP21 | 0.75 | not OK | no | 29 | 123.0 | 0.37 | >58 |
| 7/2 | PP21 | 1.0 | not OK | no | 29 | 106.0 | 0.50 | 24 |
| 7/3 | PP21 | 1.0 | not OK | no | 28 | 90.0 | 0.60 | 9 |
| 7/4 | PP21 PP28 | 0.75 | OK | v. good | 28 | 93.0 | 0.49 | >58 |
| 7/6 | PP21 PP28 | 0.875 | not OK | v. good | 29 | 97.0 | 0.51 | 31 |
| 7/7 | PP21 PP28 | 1.0 | not OK | v. good | 28 | 83.0 | 0.61 | 24 |
| 7/8 | PP21 PP34 | 0.75 | OK | no | 29 | 95.0 | 0.43 | >58 |

TABLE 11-continued

| Example No. | Porous pigments | Weight ratio porous pigment to latex | Printing tests scratch resistance | mottle | Dot gain 50% screen | IGT tests penetration test length [mm] | penetration test OD | time to avoid set-off [s] |
|---|---|---|---|---|---|---|---|---|
| 7/10 | PP21 PP34 | 0.875 | not OK | no | 28 | 92.0 | 0.50 | 39 |
| 7/11 | PP21 PP34 | 1.0 | not OK | v. good | 28 | 82.0 | 0.55 | 24 |
| 7/12 | PP21 PP33 | 0.75 | OK | no | 29 | 114.0 | 0.43 | >58 |
| 7/14 | PP21 PP33 | 0.875 | OK | no | 28 | 97.0 | 0.48 | 39 |
| 7/15 | PP21 PP33 | 1.0 | not OK | no | 28 | 92.0 | 0.57 | 18 |
| 7/16 | PP21 PP32 | 0.75 | OK | no | 30 | 114.0 | 0.42 | >58 |
| 7/18 | PP21 PP32 | 0.875 | ca. OK | no | 29 | 105.0 | 0.50 | 24 |
| 7/19 | PP21 PP32 | 1.0 | OK | no | 28 | 99.0 | 0.52 | 18 |

There was no significant difference in dot gain or ink acceptance. Furthermore, no set-off was observed and there was no difference in ink adhesion. Moreover, the papers of EXAMPLES 7/4, 7/7, 7/8 and 7/14 gave very uniform ink layers. PP28 (Submicron filler from Nippon Kasei) and PP34 have a higher absorption speed than PP21 and PP28 (Submicron filler from Nippon Kasei) had the highest absorption capacity of the inorganic porous pigments evaluated.

Example 8

Combination of Porous and Opacifying Pigments

The non-transparent microvoided biaxially stretched self-supporting films 1/LS1/BS1 coated with subbing layer 3 was coated with the compositions in Table 12 with Latex 04 with different combinations of porous and opacifying pigments.

TABLE 12

| Example No. | Porous pigment No. | coverage [g/m$^2$] | Latex No. | coverage [g/m$^2$] | Binder No. | coverage [g/m$^2$] | Surfactants No. | coverage [g/m$^2$] |
|---|---|---|---|---|---|---|---|---|
| 8/1 FLX5010 | PP21 | 2.0 | L04 | 2.2 | B01 | 0.20 | S07 | 0.01 |
| 8/2 | PP21 | 1.5 | L04 | 2.2 | B01 | 0.20 | S07 | 0.01 |
| 8/3 | PP21 | 1.0 | L04 | 2.0 | B01 | 0.20 | S07 | 0.01 |
| 8/4 | PP21 | 0.5 | L04 | 2.0 | B01 | 0.20 | S07 | 0.01 |
| 8/5 | — | — | L04 | 2.2 | B01 | 0.20 | S07 | 0.01 |
| 8/6 | PP21 OP05 | 1.5 0.5 | L04 | 2.0 | B01 | 0.20 | S07 | 0.01 |
| 8/7 | PP21 OP05 | 1.0 1.0 | L04 | 2.2 | B01 | 0.20 | S07 | 0.01 |
| 8/8 | PP21 OP05 | 0.5 1.5 | L04 | 2.0 | B01 | 0.20 | S07 | 0.01 |
| 8/9 | P05 | 2.0 | L04 | 2.0 | B01 | 0.20 | S07 | 0.01 |
| 8/10 | PP21 OP10 | 1.5 0.5 | L04 | 2.2 | B01 | 0.20 | S07 | 0.01 |
| 8/11 | PP21 OP10 | 1.0 1.0 | L04 | 2.0 | B01 | 0.20 | S07 | 0.01 |
| 8/12 | PP21 OP10 | 0.5 1.5 | L04 | 2.2 | B01 | 0.20 | S07 | 0.01 |
| 8/13 | OP10 | 2.0 | L04 | 2.0 | B01 | 0.20 | S07 | 0.01 |
| 8/14 | PP21 PP25 | 1.5 0.5 | L04 | 2.0 | B01 | 0.20 | S07 | 0.01 |
| 8/15 | PP21 PP25 | 1.0 1.0 | L04 | 2.2 | B01 | 0.20 | S07 | 0.01 |
| 8/16 | PP21 PP25 | 0.5 1.5 | L04 | 2.0 | B01 | 0.20 | S07 | 0.01 |
| 8/17 | PP25 | 2.0 | L04 | 2.2 | B01 | 0.20 | S07 | 0.01 |
| 8/18 | PP21 OP09 | 1.5 0.5 | L04 | 2.0 | B01 | 0.20 | S07 | 0.01 |
| 8/19 | PP21 OP09 | 1.0 1.0 | L04 | 2.0 | B01 | 0.20 | S07 | 0.01 |
| 8/20 | PP21 OP09 | 0.5 1.5 | L04 | 2.2 | B01 | 0.20 | S07 | 0.01 |

TABLE 12-continued

| Example No. | Porous pigment No. | coverage [g/m²] | Latex No. | coverage [g/m²] | Binder No. | coverage [g/m²] | Surfactants No. | coverage [g/m²] |
|---|---|---|---|---|---|---|---|---|
| 8/21 | OP09 | 2.0 | L04 | 2.0 | B01 | 0.20 | S07 | 0.01 |
| 8/22 | PP21 | 1.5 | L04 | 2.2 | B01 | 0.20 | S07 | 0.01 |
|  | PP26 | 0.5 |  |  |  |  |  |  |
| 8/23 | PP21 | 1.0 | L04 | 2.0 | B01 | 0.20 | S07 | 0.01 |
|  | PP26 | 1.0 |  |  |  |  |  |  |
| 8/24 | PP21 | 0.5 | L04 | 2.0 | B01 | 0.20 | S07 | 0.01 |
|  | PP26 | 1.5 |  |  |  |  |  |  |
| 8/25 | PP26 | 2.0 | L04 | 2.2 | B01 | 0.20 | S07 | 0.01 |

These papers were then subjected to printing tests using a Heidelberg GTO46 printing press with a K+E 123w ink and a fountain of 4% AGFA FS330 with 10% isopropanol. The resulting prints were evaluated on the basis of tape tests, powder tests, dot-gain evaluated with a Gretag Spectroeye densitometer, print mottle and scratch resistance with the results being given in Table 13 below.

Decreasing the PP21-content increase mottle and dot gain with at PP21-contents below 1 g/m² poor drying, set-off and poor ink adhesion.

Replacement of PP21 with OP05 (Jetcoat 30, $CaCO_3$) resulted in a strong increase in print mottle and poorer ink adhesion, although Jetcoat 30 provides a contribution to the ink-drying process, albeit small.

TABLE 13

| Example No. | Pigment No. | coverage [g/m²] | Tape test dry [10 min] | Dot gain 50% screen | Surface energy [mN/m] | print mottle | Set-off | IGT test time to avoid set-off [s] |
|---|---|---|---|---|---|---|---|---|
| 8/1 FLX5010 | PP21 | 2.0 |  | 31 | <36 | no | no | 9 |
| 8/2 | PP21 | 1.5 |  | 33 | <36 | no | no | 48 |
| 8/3 | PP21 | 1.0 |  | 36 | <36 | yes | no | >58 |
| 8/4 | PP21 | 0.5 |  | 36 | 38-40 | strong | strong | >>58 |
| 8/5 | — | — |  | 29 | 36 | strong | moderate |  |
| 8/6 | PP21 | 1.5 |  | 33 | 36 | yes | no |  |
|  | OP05 | 0.5 |  |  |  |  |  |  |
| 8/7 | PP21 | 1.0 |  | 35 | 42 | strong | no |  |
|  | OP05 | 1.0 |  |  |  |  |  |  |
| 8/8 | PP21 | 0.5 |  | 36 | 36 | strong | no |  |
|  | OP05 | 1.5 |  |  |  |  |  |  |
| 8/9 | OP05 | 2.0 |  | 37 | 42 | strong | no |  |
| 8/10 | PP21 | 1.5 |  | 34 | <36 | moderate | no |  |
|  | OP10 | 0.5 |  |  |  |  |  |  |
| 8/11 | PP21 | 1.0 |  | 36 | <36 | yes | no |  |
|  | OP10 | 1.0 |  |  |  |  |  |  |
| 8/12 | PP21 | 0.5 |  | 38 | 36 | strong | yes |  |
|  | OP10 | 1.5 |  |  |  |  |  |  |
| 8/13 | OP10 | 2.0 |  | 15 | <<36 | v. strong | v. strong |  |
| 8/14 | PP21 | 1.5 |  | 32 | <36 | no | no | 24 |
|  | PP25 | 0.5 |  |  |  |  |  |  |
| 8/15 | PP21 | 1.0 |  | 34 | <36 | slight | no | >58 |
|  | PP25 | 1.0 |  |  |  |  |  |  |
| 8/16 | PP21 | 0.5 |  | 36 | 36 | yes | no | >>58 |
|  | PP25 | 1.5 |  |  |  |  |  |  |
| 8/17 | PP25 | 2.0 |  | 33 | <36 | strong | yes | >>58 |
| 8/18 | PP21 | 1.5 |  | 33 | <36 | yes | no |  |
|  | OP09 | 0.5 |  |  |  |  |  |  |
| 8/19 | PP21 | 1.0 |  | 34 | 36 | strong | no |  |
|  | OP09 | 1.0 |  |  |  |  |  |  |
| 8/20 | PP21 | 0.5 |  | 36 | 42 | strong | strong |  |
|  | OP09 | 1.5 |  |  |  |  |  |  |
| 8/21 | OP09 | 2.0 |  | 39 | 36 | v. strong | v. strong |  |
| 8/22 | PP21 | 1.5 |  | 31 | <36 | slight | no | >58 |
|  | PP26 | 0.5 |  |  |  |  |  |  |
| 8/23 | PP21 | 1.0 |  | 32 | 38 | yes | no | >>58 |
|  | PP26 | 1.0 |  |  |  |  |  |  |
| 8/24 | PP21 | 0.5 |  | 34 | 36 | strong | no | >>58 |
|  | PP26 | 1.5 |  |  |  |  |  |  |
| 8/25 | PP26 | 2.0 |  | 32 | 36 | strong | no | >>58 |

Replacement of PP21 with OP10 (Hydragloss 90, china clay/kaolin) resulted in a strong increase in print mottle and poorer ink adhesion. Moreover, OP10 provided no contribution to the ink-drying process.

Replacement of PP21 with PP25 [Mitral 9400, [Al(OH)$_3$] resulted in an improvement in ink adhesion and a slight increase in mottle. Moreover, PP25 contributed to the drying process, although less strongly than PP21 as shown by the complete replacement of PP21 with PP25 resulting in poor drying and strong mottle.

Replacement of PP21 with OP09 (Snowtex ST40, colloidal silica) resulted in a strong increase in print mottle and poorer ink adhesion. Moreover, OP09 provided no contribution to the ink-drying process.

Replacement of PP21 with PP26 (Digitex 1000, kaolin) had no effect on the mottle and improved the drying and ink adhesion.

Example 9

Screening of Different Water-Soluble Binders

The non-transparent microvoided biaxially stretched self-supporting films 1/LS1/BS1 coated with subbing layer 3 was coated with the compositions in Table 14 with Latex 03 and Latex 04 with different binders to investigate whether this might reduce the print mottle.

TABLE 14

| Example No. | Porous pigment No. | coverage [g/m$^2$] | Latex No. | coverage [g/m$^2$] | Binder No. | coverage [g/m$^2$] | Surfactants No. | coverage [g/m$^2$] |
|---|---|---|---|---|---|---|---|---|
| 9/1 Dispercoll U53 | PP21 | 2.2 | L03 | 2.2 | — | — | S07 | 0.01 |
| 9/2 | PP21 | 2.0 | L03 | 2.0 | — | — | S07 | 0.01 |
| 9/3 | PP21 | 2.2 | L03 | 2.2 | B01 | 0.22 | S07 | 0.01 |
| 9/4 | PP21 | 2.0 | L03 | 2.0 | B01 | 0.20 | S07 | 0.01 |
| 9/5 | PP21 | 2.0 | L03 | 2.0 | B01 | 0.20 | S07 | 0.01 |
| 9/6 | PP21 | 2.2 | L03 | 2.2 | B02 | 0.22 | S07 | 0.01 |
| 9/7 | PP21 | 2.0 | L03 | 2.0 | B02 | 0.60 | S07 | 0.01 |
| 9/8 | PP21 | 2.2 | L03 | 2.2 | B03 | 0.22 | S07 | 0.01 |
| 9/9 | PP21 | 2.2 | L03 | 2.2 | B04 | 0.22 | S07 | 0.01 |
| 9/10 | PP21 | 2.0 | L03 | 2.0 | B01 IN02 | 0.20 0.20 | S07 | 0.01 |
| 9/11 FLX5010 | PP21 | 2.2 | L04 | 2.2 | — | — | S07 | 0.01 |
| 9/12 | PP21 | 2.2 | L04 | 2.2 | B01 | 0.22 | S07 | 0.01 |
| 9/13 | PP21 | 2.2 | L04 | 2.2 | B01 | 0.22 | S07 | 0.01 |
| 9/14 | PP21 | 2.2 | L04 | 2.2 | B02 | 0.22 | S07 | 0.01 |
| 9/15 | PP21 | 2.2 | L04 | 2.2 | B02 | 0.22 | S07 | 0.01 |
| 9/16 | PP21 | 2.2 | L04 | 2.2 | B02 | 0.33 | S07 | 0.01 |
| 9/17 | PP21 | 2.2 | L04 | 2.2 | B02 | 0.44 | S07 | 0.01 |
| 9/18 | PP21 | 2.2 | L04 | 2.2 | B02 | 0.50 | S07 | 0.01 |
| 9/19 | PP21 | 2.2 | L04 | 2.2 | B03 | 0.22 | S07 | 0.01 |
| 9/20 | PP21 | 2.2 | L04 | 2.2 | B04 | 0.22 | S07 | 0.01 |

These papers were then subjected to printing tests using a Heidelberg GT046 printing press with a K+E 123w ink and a fountain of 4% Emerald Premium with 10% isopropanol. The resulting prints were evaluated on the basis of tape tests, powder tests, dot-gain evaluated with a Gretag Spectroeye densitometer, print mottle and scratch resistance with the results being given in Table 15 below.

TABLE 15

| Example No.. | Binder No. | coverage [g/m$^2$] | Tape test dry 10 min | Powder test | Dot gain 50% screen | print mottle | Scratch resistance |
|---|---|---|---|---|---|---|---|
| 9/1 Dispercoll U53 | — | — | strong cohesive break | OK | 20 | no | OK |
| 9/2 | — | — | strong cohesive break | OK |  | yes | OK |
| 9/3 | B01 | 0.22 | strong cohesive break | light | 22 | no | OK |
| 9/4 | B01 | 0.20 | OK | powdery | 33 | no | OK |

TABLE 15-continued

| Example No. | Binder No. | coverage [g/m²] | Tape test dry 10 min | Powder test | Dot gain 50% screen | print mottle | Scratch resistance |
|---|---|---|---|---|---|---|---|
| 9/5 | B01 | 0.20 | light cohesive break | powdery | | no | OK |
| 9/6 | B02 | 0.22 | strong cohesive break | light | 20 | yes | OK |
| 9/7 | B02 | 0.20 | strong cohesive break | OK | 31 | no | OK |
| 9/8 | B03 | 0.22 | strong cohesive break | OK | 22 | no | OK |
| 9/9 | B04 | 0.22 | strong cohesive break | OK | 22 | no | OK |
| 9/10 | B01 | 0.20 | OK | OK | | slight | OK |
|  | IN02 | 0.20 | | | | | |
| FLX5010 9/11 | — | — | light cohesive break | light | 23 | no | OK |
| 9/12 | B01 | 0.22 | OK | OK | 19 | no | OK |
| 9/13 | B01 | 0.22 | — | — | 26 | no | OK |
| 9/14 | B02 | 0.22 | strong cohesive break | OK | 23 | yes | OK |
| 9/15 | B02 | 0.22 | — | — | 27 | no | OK |
| 9/16 | B02 | 0.33 | — | — | 27 | no | OK |
| 9/17 | B02 | 0.44 | — | — | 28 | no | OK |
| 9/18 | B02 | 0.50 | — | — | 28 | no | OK |
| 9/19 | B03 | 0.22 | OK | OK | 24 | no | OK |
| 9/20 | B04 | 0.22 | OK | OK | 24 | no | OK |

Surprisingly it was found that the papers with L03 as latex exhibited strong cohesive fracture in the receiving layer, whether or not a binder was used except when a combination of B01 and IN02 was used. The papers with L04 as latex only exhibited strong cohesive fracture when a polyvinyl alcohol with a low degree of hydrolysis, e.g. 74%, was used as a binder and the use polyvinyl alcohol with a degree of hydrolysis of at least 87-88% improved the resistance of the receiving layer to cohesive fracture. Increasing the concentration of B02 was not possible due to foaming and high viscosities.

Example 10

Printing Performance with Added Binder and/or Hardeners

The non-transparent microvoided biaxially stretched self-supporting films 1/LS1/BS1 coated with subbing layer 3 was coated with the compositions in Table 16 including a binder to improve reduce the print mottle.

TABLE 16

| Example No. | Porous pigment No. | coverage [g/m²] | Latex No. | coverage [g/m²] | Binder No. | coverage [g/m²] | matting agent No. | coverage [g/m²] | Surfactants No. | coverage [g/m²] |
|---|---|---|---|---|---|---|---|---|---|---|
| 10/1 FLX5000 | PP21 | 2.0 | L01 | 2.0 | B01 | 0.2 | MA01 | 0.06 | S05 S06 | 0.02 0.04 |
| 10/2 FLX5000 | PP21 | 3.0 | L01 | 3.0 | B01 | 0.3 | MA01 | 0.06 | S05 S06 | 0.02 0.04 |
| 10/3 FLX5000 | PP21 | 2.0 | L01 | 2.0 | B01 | 0.2 | MA01 | 0.06 | S05 S06 | 0.02 0.04 |
| 10/4 FLX5000 | PP21 | 2.0 | L01 | 2.0 | B01 | 0.2 | MA01 | 0.06 | S05 S06 | 0.02 0.04 |
| 10/5 Dispercoll U53 | PP21 | 2.0 | L03 | 2.0 | B01 | 0.2 | MA01 | 0.06 | S05 S06 | 0.02 0.04 |
| 10/6 FLX5000 | PP21 | 2.0 | L01 | 2.0 | B01 | 0.2 | MA01 | 0.06 | S05 S06 | 0.02 0.04 |

These papers were then subjected to printing tests using an A.B. Dick 9860 with a K+E 123w ink and a fountain of 4% Emerald Premium in isopropanol. During the printing first the quantity of fountain was varied for a constant quantity of ink and then the quantity of fountain was kept constant and the quantity of ink varied. The resulting prints were evaluated on the basis of solid optical densities and dot gain with a Gretag Spectroeye densitometer with the results being given in Table 17. Furthermore, print penetration and drying time tests were carried out on the papers with an IGT Global Standard Tester 2, with the results also being given in Table 17.

TABLE 17

| | Example No. | | | | | |
|---|---|---|---|---|---|---|
| | 10/1 | 10/2 | 10/3 | 10/4 | 10/5 | 10/6 |
| Fountain environment | | | | | | |
| optimum | 45% Dg | 45% Dg | 45% Dg | 45% Dg | 45% Dg | 45% Dg |
| window below | 10% | 10% | 10% | 5% | 10% | 10% |
| window above | 20% | 15% | 15% | 15% | 30% | 30% |
| Ink environment | | | | | | |
| optimum ink setting | 10 | 10 | 10 | | 8 | |
| window below | 0 | 0 | 0 | | 4 | |
| window above | 10 | 5 | 5 | | 8 | |
| dot gain for 50% screen at optimum setting | | | | | | |
| Gretag Spectroeye | 26% | 23% | 24% | 25% | 22% | 28% |
| mottle | slight | slight | v. slight | v. slight | no | v. slight |

TABLE 17-continued

| | Example No. | | | | | |
|---|---|---|---|---|---|---|
| | 10/1 | 10/2 | 10/3 | 10/4 | 10/5 | 10/6 |
| print penetration test with IGT Global Standard Tester 2 | | | | | | |
| length of ink streak on rotating drum [mm] | 89.3 | 90.7 | 90.3 | 91.3 | 89.0 | 90.3 |
| optical density | 0.59 | 0.67 | 0.56 | 0.57 | 0.49 | 0.56 |
| set-off test with Huber set-off ink with IGT Global Standard Tester 2 | | | | | | |
| drying time [s] | 8 | >11 | >11 | 7 | 5 | 5 |

Using the paper of EXAMPLE 10/1 as a reference, the paper of EXAMPLE 10/2 with an increased layer thickness gave a marginally improved set-off performance and significantly reduced dot gain. The paper of EXAMPLE 10/3 with Zonyl FS0100, S07, as a surfactant rather than a mixture of surfactants exhibited similar set-off properties, but exhibited significantly reduced dot gain. However, the paper of EXAMPLE 10/4 with double the quantity of surfactant S07 resulted in a further reduction in dot gain, but at the expense of coating defects. Adding the silica and binder together, as in the paper of EXAMPLE 10/6, had no effect on the printing performance.

A comparison of the printing performance of the paper of EXAMPLE 10/5 with that of EXAMPLE 10/1 shows that the change in the latex from Latex 01 to Latex 03 resulted in a significant improvement: a reduction in set-off, i.e. in drying speed together with a significant reduction in dot gain.

Example 11

The non-transparent microvoided biaxially stretched self-supporting films 1/LS1/BS1 coated with subbing layer 3 was coated with the compositions in Table 18 including a binder to improve reduce the print mottle.

TABLE 18

| Example No. | Porous pigment No. | coverage [g/m²] | Latex No. | coverage [g/m²] | Binder No. | coverage [g/m²] | Surfactant No. | coverage [g/m²] |
|---|---|---|---|---|---|---|---|---|
| 11/1 FLX5010 | PP21 | 2.6 | L04 | 2.6 | B01 | 0.26 | S07 | 0.01 |
| 11/2 FLX5010 | PP21 | 3.0 | L04 | 3.0 | B01 | 0.30 | S07 | 0.01 |
| 11/3 FLX5010 | PP21 | 4.0 | L04 | 4.0 | B01 | 0.40 | S07 | 0.01 |
| 11/4 FLX5010 | PP21 | 2.0 | L04 | 2.0 | B01 | 0.20 | S07 | 0.01 |
| 11/5 Dispercoll U53 | PP21 | 2.6 | L03 | 2.6 | B01 | 0.26 | S07 | 0.01 |
| 11/6 Dispercoll U53 | PP21 | 3.0 | L03 | 3.0 | B01 | 0.30 | S07 | 0.01 |
| 11/7 Dispercoll U53 | PP21 | 4.0 | L03 | 4.0 | | 0.40 | S07 | 0.01 |
| 11/8 Dispercoll U53 | PP21 | 2.0 | L03 | 2.0 | | 0.20 | S07 | 0.01 |

Print penetration tests were carried out on the papers of EXAMPLES 11/1 to 11/8 with an IGT Global Standard Tester 2, with the results also being given in Table 19.

TABLE 19

| | Example No. | | | | | | | |
|---|---|---|---|---|---|---|---|---|
| | 11/1 | 11/2 | 11/3 | 11/4 | 11/5 | 11/6 | 11/7 | 11/8 |
| | print penetration test with IGT Global Standard Tester 2 | | | | | | | |
| length of ink streak on rotating drum [mm] | 109.7 | 113.3 | 89.7 | 100.3 | 83.3 | 88 | 81 | 85.7 |
| optical density | 0.54 | 0.51 | 0.66 | 0.55 | 0.60 | 0.69 | 0.80 | 0.53 |

The results in Table xx clearly show the more rapid penetration of ink into layers containing Latex 03, Dispercoll U53, compared to comparable layers containing Latex 04, JONCRYL FLX5010.

Example 12

Evaluation of Matting Agents

The non-transparent microvoided biaxially stretched self-supporting films 1/LS1/BS1 coated with subbing layer 3 was coated with the compositions in Table 20 including different matting agents to improve the transport properties of the papers.

TABLE 20

| Example No. | Porous pigment No. | coverage [g/m²] | Latex No. | coverage [g/m²] | Binder No. | coverage [g/m²] | matting agent No. | coverage [g/m²] | Surfactants No. | coverage [g/m²] |
|---|---|---|---|---|---|---|---|---|---|---|
| 12/1 FLX5010 | PP21 | 2.2 | L04 | 2.2 | B01 | 0.22 | — | — | S07 | 0.01 |
| 12/2 | PP21 | 2.2 | L04 | 2.2 | B01 | 0.22 | — | — | S07 | 0.01 |
| 12/3 | PP21 | 2.2 | L04 | 2.2 | B01 | 0.22 | — | — | S07 | 0.01 |
| 12/4 | PP21 | 2.2 | L04 | 2.2 | B01 | 0.22 | MA01 | 0.05 | S07 | 0.01 |
| 12/5 | PP21 | 2.2 | L04 | 2.2 | B01 | 0.22 | MA01 | 0.1 | S07 | 0.01 |
| 12/6 | PP21 | 2.2 | L04 | 2.2 | B01 | 0.22 | MA01 | 0.1 | S07 | 0.01 |
| 12/7 | PP21 | 2.2 | L04 | 2.2 | B01 | 0.22 | MA01 | 0.1 | S07 | 0.01 |
| 12/8 | PP21 | 2.2 | L04 | 2.2 | B01 | 0.22 | MA01 | 0.1 | S07 | 0.01 |
| 12/9 | PP21 | 2.2 | L04 | 2.2 | B01 | 0.22 | MA01 | 0.15 | S07 | 0.01 |
| 12/10 | PP21 | 2.2 | L04 | 2.2 | B01 | 0.22 | MA01 | 0.20 | S07 | 0.01 |
| 12/11 | PP21 | 2.2 | L04 | 2.2 | B01 | 0.22 | MA01 | 0.25 | S07 | 0.01 |
| 12/12 | PP21 | 2.2 | L04 | 2.2 | B01 | 0.22 | MA01 | 0.25 | S07 | 0.01 |
| 12/13 | PP21 | 2.2 | L04 | 2.2 | B01 | 0.22 | MA01 | 0.30 | S07 | 0.01 |
| 12/14 | PP21 | 2.2 | L04 | 2.2 | B01 | 0.22 | MA01 | 0.5 | S07 | 0.01 |
| 12/15 | PP21 | 2.2 | L04 | 2.2 | B01 | 0.22 | MA02 | 0.1 | S07 | 0.01 |
| 12/16 | PP21 | 2.2 | L04 | 2.2 | B01 | 0.22 | MA03 | 0.1 | S07 | 0.01 |
| 12/17 | PP21 | 2.2 | L04 | 2.2 | B01 | 0.22 | MA04 | 0.1 | S07 | 0.01 |
| 12/18 | PP21 | 2.2 | L04 | 2.2 | B01 | 0.22 | MA05 | 0.1 | S07 | 0.01 |
| 12/19 | PP21 | 2.2 | L04 | 2.2 | B01 | 0.22 | MA06 | 0.1 | S07 | 0.01 |
| 12/20 | PP21 | 2.2 | L04 | 2.2 | B01 | 0.22 | MA07 | 0.1 | S07 | 0.01 |
| 12/21 | PP21 | 2.2 | L04 | 2.2 | B01 | 0.22 | MA08 | 0.1 | S07 | 0.01 |
| 12/22 | PP21 | 2.2 | L04 | 2.2 | B01 | 0.22 | MA09 | 0.1 | S07 | 0.01 |
| 12/23 | PP21 | 2.2 | L04 | 2.2 | B01 | 0.22 | MA10 | 0.04 | S07 | 0.01 |
| 12/24 | PP21 | 2.2 | L04 | 2.2 | B01 | 0.22 | MA10 | 0.06 | S07 | 0.01 |
| 12/25 | PP21 | 2.2 | L04 | 2.2 | B01 | 0.22 | MA10 | 0.08 | S07 | 0.01 |
| 12/26 | PP21 | 2.2 | L04 | 2.2 | B01 | 0.22 | MA10 | 0.1 | S07 | 0.01 |
| 12/27 | PP21 | 2.2 | L04 | 2.2 | B01 | 0.22 | MA10 | 0.1 | S07 | 0.01 |
| 12/28 | PP21 | 2.2 | L04 | 2.2 | B01 | 0.22 | MA11 | 0.1 | S07 | 0.01 |
| 12/29 | PP21 | 2.2 | L04 | 2.2 | B01 | 0.22 | MA12 | 0.04 | S07 | 0.01 |
| 12/30 | PP21 | 2.2 | L04 | 2.2 | B01 | 0.22 | MA12 | 0.06 | S07 | 0.01 |
| 12/31 | PP21 | 2.2 | L04 | 2.2 | B01 | 0.22 | MA12 | 0.08 | S07 | 0.01 |
| 12/32 | PP21 | 2.2 | L04 | 2.2 | B01 | 0.22 | MA12 | 0.1 | S07 | 0.01 |
| 12/33 | PP21 | 2.2 | L04 | 2.2 | B01 | 0.22 | MA12 | 0.1 | S07 | 0.01 |

The papers were evaluated in a series of tests to establish the physical effect of the matting agents on the surface smoothness and the frictional coefficient between sheets. Surface roughness was determined by Bekk tests and Perth-O-meter measurements.

Furthermore the scratch resistance was evaluated qualitatively using a nail test and quantitatively using the Linimark evaluation method with a Roberta apparatus giving the threshold force at and above which scratching was observed. The results are summarized in Table 21 below.

The Bekk tests showed that a greater surface roughness was realized with matting agents MA02 and MA04 to MA12 than with MA01 or MA03, whereas according to the Pert-O-meter measurements papers with MA01 and MA04 exhibited higher $R_a$ values than with MA02 and MA03. The frictional measurements showed a significant reduction in friction with matting agents MA01 and MA02, whereas the paper of EXAMPLE 12/13 exhibited no significant change and the paper of EXAMPLE 12/14 showed an increase in frictional coefficients.

TABLE 21

| | matting agent | | Bekk test [sec] | $R_a$ from Pert-O-meter [μm] | Static frictional coefficient | nail test | Scratch resistance tests Linimark wet [mN] | Lini-mark dry [mN] |
|---|---|---|---|---|---|---|---|---|
| Example No. | No. | coverage [g/m$^2$] | | | | | | |
| 12/1 | — | — | 2285 | 0.36 | 0.76 | OK | | |
| 12/2 | — | — | 1205 | — | — | ca. OK | | |
| 12/3 | — | — | 1701 | | | ca. OK | | |
| 12/4 | MA01 | 0.05 | 1175 | — | — | ca. OK | | |
| 12/5 | MA01 | 0.1 | 1407 | 0.34 | 0.61 | OK | | |
| 12/6 | MA01 | 0.1 | 1147 | — | — | ca. OK | | |
| 12/7 | MA01 | 0.1 | 1406 | | | ca. OK | | |
| 12/8 | MA01 | 0.1 | 1737 | | | OK | 21 | 33 |
| 12/9 | MA01 | 0.15 | 1108 | — | — | ca. OK | | |
| 12/10 | MA01 | 0.20 | 1187 | — | — | ca. OK | | |
| 12/11 | MA01 | 0.25 | 1025 | 0.50 | 0.61 | OK | | |
| 12/12 | MA01 | 0.25 | 1061 | — | — | ca. OK | | |
| 12/13 | MA01 | 0.30 | 1009 | — | — | ca. OK | | |
| 12/14 | MA01 | 0.5 | 854 | 0.48 | 0.55 | ca. OK | | |
| 12/15 | MA02 | 0.1 | 409 | 0.37 | 0.69 | v. good | | |
| 12/16 | MA03 | 0.1 | 1153 | 0.33 | 0.78 | not OK | | |
| 12/17 | MA04 | 0.1 | 152.3 | 0.58 | 0.84 | not OK | | |
| 12/18 | MA05 | 0.1 | 423 | | | ca. OK | | |
| 12/19 | MA06 | 0.1 | 258 | | | ca. OK | | |
| 12/20 | MA07 | 0.1 | 685 | | | ca. OK | | |
| 12/21 | MA08 | 0.1 | 291 | | | OK | | |
| 12/22 | MA09 | 0.1 | 566 | | | OK | | |
| 12/23 | MA10 | 0.04 | 462 | | | OK | 15 | 20 |
| 12/24 | MA10 | 0.06 | 392 | | | OK | 15 | 26 |
| 12/25 | MA10 | 0.08 | 245 | | | OK | 17 | 29 |
| 12/26 | MA10 | 0.1 | 491 | | | OK | | |
| 12/27 | MA10 | 0.1 | 228 | | | OK | 19 | 34 |
| 12/28 | MA11 | 0.1 | 816 | | | ca. OK | | |
| 12/29 | MA12 | 0.04 | 116 | | | ca. OK | | |
| 12/30 | MA12 | 0.06 | 61 | | | ca. OK | | |
| 12/31 | MA12 | 0.08 | 49 | | | ca. OK | | |
| 12/32 | MA12 | 0.1 | 170 | | | OK | | |
| 12/33 | MA12 | 0.1 | 34 | | | ca. OK | | |

Printing evaluation was carried out using a Heidelberg GT046 printing press with a K+E 123W ink and a fountain of 4% Emerald Premium with 10% isopropanol with an Azura printing plate exposed at 275 mJ/cm$^2$ with a CREO exposure station. The printing results are summarized in Table 22 below.

TABLE 22

| Example No. | matting agent No. | coverage [g/m$^2$] | Tape test dry [10 min] | Powder test | dot gain for 50% screen | Print mottle | IGT test time to avoid set-off [s] |
|---|---|---|---|---|---|---|---|
| 12/1 | — | — | OK | slight | 27 | no | |
| 12/2 | — | — | OK | | | yes/no | 9 |
| 12/3 | — | — | OK | v. slight | 24 | yes/no | |
| 12/4 | MA01 | 0.05 | — | OK | | no | 24 |
| 12/5 | MA01 | 0.1 | OK | v. slight | 26 | no | |
| 12/6 | MA01 | 0.1 | — | OK | | no | 13 |
| 12/7 | MA01 | 0.1 | OK | v. slight | 23 | yes/no | |
| 12/8 | MA01 | 0.1 | OK | OK | 28 | no | |
| 12/9 | MA01 | 0.15 | — | OK | | yes/no | 18 |
| 12/10 | MA01 | 0.20 | — | OK | | yes/no | 18 |
| 12/11 | MA01 | 0.25 | OK | v. slight | 26 | no | |
| 12/12 | MA01 | 0.25 | — | OK | | yes/no | 18 |
| 12/13 | MA01 | 0.30 | — | OK | | yes/no | 18 |
| 12/14 | MA01 | 0.5 | OK | v. slight | 27 | no | |
| 12/15 | MA02 | 0.1 | OK | v. slight | 29 | no | |
| 12/16 | MA03 | 0.1 | OK | slight | 31 | no | |
| 12/17 | MA04 | 0.1 | OK | v. slight | 26 | no | |
| 12/18 | MA05 | 0.1 | OK | powdery | 23 | yes/no | |
| 12/19 | MA06 | 0.1 | OK | v. slight | 23 | yes/no | |
| 12/20 | MA07 | 0.1 | OK | v. slight | 23 | yes/no | |
| 12/21 | MA08 | 0.1 | OK | v. slight | 23 | yes/no | |
| 12/22 | MA09 | 0.1 | OK | powdery | 23 | yes/no | |
| 12/23 | MA10 | 0.04 | OK | OK | 28 | no | |
| 12/24 | MA10 | 0.06 | OK | OK | 28 | no | |
| 12/25 | MA10 | 0.08 | OK | OK | 28 | no | |
| 12/26 | MA10 | 0.1 | OK | v. good | 23 | yes/no | |
| 12/27 | MA10 | 0.1 | OK | OK | 28 | no | |
| 12/28 | MA11 | 0.1 | OK | powdery | 23 | yes/no | |
| 12/29 | MA12 | 0.04 | OK | OK | 28 | no | |
| 12/30 | MA12 | 0.06 | OK | OK | 27 | no | |
| 12/31 | MA12 | 0.08 | OK | OK | 27 | no | |
| 12/32 | MA12 | 0.1 | OK | v. slight | 22 | yes/no | |
| 12/33 | MA12 | 0.1 | OK | OK | 27 | no | |

An increase in dot gain was observed with papers with MA02 and MA03 and a slight reduction in the case of MA01 and MA04 to MA12. The scratch resistance of the papers was improved with the matting agents MA2 (polyethylene particles), MA8 (benzoguanine-melamine/formaldehyde particles), MA9 (polyamide particles) and MA 10 (ethylene-acrylic acid copolymer particles), was acceptable with the matting agent MA1, but deteriorated with matting agents MA3 and MA4.

Example 13

Printing Performance

The film 1/LS1/BS1 subbed with subbing layer 3 was coated with a single layer on both sides of the different receiving layer with the compositions and coating weights given in Table 23.

TABLE 23

| Example No. | Latex No. | wt % | Porous pigment No. | wt % | Binder No. | wt % | Slip agent/matting agent No. | wt % | Surfactant No. | wt % | Proxel wt % | Coating wt [g/m²] |
|---|---|---|---|---|---|---|---|---|---|---|---|---|
| 13/1 FLX5000 | L01 | 67.8 | PP21 | 25.4 | — | — | SL01 | 6.8 | — | — | | 2.95 |
| 13/2 FLX5000 | L01 | 67.5 | PP21 | 25.3 | — | — | SL01 | 6.8 | S05 S06 | 0.2 0.1 | | 2.96 |
| 13/3 FLX5000 | L01 | 55.4 | PP21 | 41.5 | — | — | MA15 | 2.8 | S05 S06 | 0.2 0.1 | | 3.61 |
| 13/4 FLX5010 | L04 | 47.58 | PP21 | 47.48 | B01 | 4.76 | — | — | S07 | 0.18 | | 4.84 |
| 13/5 Dispercoll U53 | L03 | 47.5 | PP21 | 47.5 | B01 | 4.8 | — | — | S07 | 0.2 | | 4.38 |
| 13/6 FLX5010 | L04 | 46.62 | PP21 | 46.51 | B01 | 4.66 | MA01 | 2.0 | S07 | 0.17 | 0.004 | 4.94 |

A single layer with the composition of EXAMPLE 6 was also successfully coated on film 1/LS1/BS1 subbed with subbing layers 4 and 5. Furthermore, it could be coated on corona-treated PGA paper, corona-treated KLEPA paper and also on cast-coated paper.

The most significant differences in the papers of EXAMPLES 3 to 8 lie in the coating weight of the porous pigment PP21 rising from 0.75 g/m2 for the papers of EXAMPLES 3 and 4 to 1.5 g/m2 in the case of the paper of EXAMPLE 5 to 2.9 g/m2 in the case of the papers of EXAMPLES 6 and 7. This had a parallel effect on the drying behaviour of the papers, since the porosity of the receiving layers is determined by the quantity of porous pigment present therein, with the papers of EXAMPLES 3 and 4 exhibiting poor drying behaviour, whereas drying was acceptable in the case of the papers of EXAMPLES 5, 6 and 7. The scratch resistance of the papers of EXAMPLES 3, 4 and 5 was good, that of the paper of EXAMPLE 6 poor and those of the papers of EXAMPLES 7 and 8 made acceptable by the incorporation of a water-soluble binder to counter problems due to flaking.

The different latexes used had an influence upon the alkali resistance in which the paper of EXAMPLES 13/1, 13/2 and 13/3 with JONCRYL FLX5000 scored poorly, whereas the papers of EXAMPLES 13/4, 13/5 and 13/6 with JONCRYL FLX5010, also a styrene-acrylic latex and DISPERCOLL U53, a polyurethane resin scored well in this regard. However, DISPERCOLL U53 scored poorly in respect of UV-stability, whereas JONCRYL FLX 5000 and 5010 scored well in this regard.

The surface energies of the papers of EXAMPLES 13/3, 13/4, 13/5 and 13/6 were measured via contact angle measurements and the polar and disperse contributions determined. The results are summarized in Table 24.

TABLE 24

| | Surface free energy | | | |
|---|---|---|---|---|
| Example No. | γSp mN/m | γSd mN/m | γS mN/m | liquids used |
| 13/3 | 0.00 | 34.12 | 34.12 | all liquids |
| 13/4 | 0.79 | 41.92 | 42.71 | only glycerine |
| | 2.59 | 42.46 | 45.06 | all liquids |
| 13/5 | 34.40 | 27.16 | 61.56 | only glycerine |
| 13/6 | 4.63 | 39.86 | 44.49 | all liquids |

These papers were then subjected to printing tests using a Heidelbery GT052 printing press equipped with a Dahlgren fountain system, which allowed the quantity of fountain by printing to be accurately set. During the printing first the quantity of fountain was varied for a constant quantity of ink and then the quantity of fountain was kept constant and the quantity of ink varied. The resulting prints were evaluated on the basis of solid optical densities and dot gain with a Gretag Spectroeye densitometer with the results being given in Table 25.

TABLE 25

| | Example No. | | | | | |
|---|---|---|---|---|---|---|
| | 13/1 | 13/2 | 13/3 | 13/4 | 13/5 | 13/6 |
| | Fountain environment | | | | | |
| optimum | | | 50% Dg | 55% Dg | 50% Dg | 60% Dg |
| window below | | | 20% | 25% | 20% | 25% |
| window above | | | 5% | 20% | 25% | 25% |
| | Ink environment | | | | | |
| optimum ink setting | | | 8 | 8 | 8 | 8 |
| window below | | | 4 | 4 | 4 | 4 |
| window above | | | 2 | 6 | 6 | 10 |
| | dot gain for 50% screen at optimum setting | | | | | |
| Gretag Spectroeye | | | 30% | 19% | 16% | 16% |

The papers of EXAMPLES 13/1 and 13/2 had an acceptable printing window, but set-off was a problem due to the poor drying performance of these papers. EXAMPLES 13/4 and 13/5 had clearly a greater printing window and less dot gain than the paper of EXAMPLE 13/3. Furthermore, the paper of EXAMPLE 5 exhibited print mottle, which was not observed with the papers of EXAMPLES 13/4 and 13/5. The papers of EXAMPLES 13/4 and 13/5 exhibited no set-off, rapid drying even at high ink settings, stable printing performance and exhibited identical printing behaviour to paper. No significant difference was observed between the printing performances of the papers of EXAMPLES 13/4 and 13/5.

Example 14

Optimalization of Receiving Layer Composition

The subbed film 1/LS1/BS1 was coated with a single layer on both sides of the different receiving layer compositions in Table 26.

TABLE 26

| Example No. | latex L04 [g/m²] | PP 12 [g/m²] | wt ratio latex/porous pigment | binder B01 [g/m²] | Surfactact S07 [g/m²] | Total coating weight [g/m²] | pore volume* [mL/m²] | oil absorption* [mg/cm²] |
|---|---|---|---|---|---|---|---|---|
| 14/1 | 2 | 2 | 1.00 | 0.20 | 0.01 | | 3.2 | 60 |
| 14/2 | 3 | 2 | 1.50 | 0.20 | 0.01 | | 3.2 | 60 |
| 14/3 | 4 | 2 | 2.00 | 0.20 | 0.01 | | 3.2 | 60 |
| 14/4 | 4 | 3 | 1.33 | 0.20 | 0.01 | | 4.8 | 90 |
| 14/5 | 4 | 4 | 1.00 | 0.20 | 0.01 | | 6.4 | 120 |
| 14/6 | 4 | 3 | 2.00 | 0.20 | 0.01 | | 4.8 | 90 |
| 14/7 | 2 | 0.75 | 2.67 | 0.20 | 0.01 | | 1.2 | 22.5 |
| 14/8 | 2 | 1 | 2.00 | 0.20 | 0.01 | | 1.6 | 30 |
| 14/9 | 2 | 1.25 | 1.60 | 0.20 | 0.01 | | 2 | 37.5 |
| 14/10 | 2 | 1.5 | 1.33 | 0.20 | 0.01 | | 2.4 | 45 |
| 14/11 | 2 | 1.75 | 1.14 | 0.20 | 0.01 | | 2.8 | 52.5 |
| 14/12 | 2 | 2 | 1.00 | 0.20 | 0.01 | | 3.2 | 60 |
| 14/13 | 2.5 | 1.5 | 1.67 | 0.20 | 0.01 | | 2.4 | 45 |
| 14/14 | 3 | 1.5 | 2.00 | 0.20 | 0.01 | | 2.4 | 45 |
| 14/15 | 3.5 | 1.5 | 2.33 | 0.20 | 0.01 | | 2.4 | 45 |
| 14/16 | 4 | 1.5 | 2.67 | 0.20 | 0.01 | | 2.4 | 45 |
| 14/17 | 2 | 2 | 1.00 | 0.20 | 0.01 | 4.20 | 3.2 | 60 |
| 14/18 | 1.75 | 1.75 | 1.00 | 0.17 | 0.01 | 3.67 | 2.8 | 52.5 |
| 14/19 | 1.5 | 1.5 | 1.00 | 0.15 | 0.01 | 3.15 | 2.4 | 45 |
| 14/20 | 1.25 | 1.25 | 1.00 | 0.12 | 0.01 | 2.62 | 2 | 37.5 |
| 14/21 | 1 | 1 | 1.00 | 0.10 | 0.01 | 2.10 | 1.6 | 30 |
| 14/22 | 0.75 | 0.75 | 1.00 | 0.07 | 0.01 | 1.57 | 1.2 | 22.5 |
| 14/23 | 0.5 | 0.5 | 1.00 | 0.05 | 0.01 | 1.05 | 0.8 | 15 |
| 14/24 | 1.5 | 1.5 | 1.00 | 0.20 | 0.01 | 3.20 | 2.4 | 45 |
| 14/25 | 1.0 | 1.0 | 1.00 | 0.20 | 0.01 | 2.20 | 1.6 | 30 |
| 14/26 | 0.5 | 0.5 | 1.00 | 0.20 | 0.01 | 1.20 | 0.8 | 15 |

*calculated on the basis of the coverage of porous pigment from a pore volume of 1.6 mL/g and oil absorption of 300 g/100 g These papers were then subjected to printing tests using a Heidelberg GT052 printing press with K+E 123w ink and a 4% Emerald Premium fountain with 10% isopropanol. This printing press was equipped with a Dahlgren fountain system, which allowed the quantity of fountain by printing to be accurately set.

The print quality was evaluated both by qualitative visual inspection tests and quantitative tests with an IGT Global Standard Tester-2 in which the drying time to avoid set-off was determined according to ISO 3783 and ink penetration evaluated on the basis of the track formed and optical density of a 0.6 µL coloured dibutyl phthalate droplet applied to a paper with the receiving layer composition being evaluated on a rotating drum according to NEN 1836. The results are also given in Table 27.

TABLE 27

| | | | visual inspection tests | | | tests with IGT Global Standard Tester-2 | | |
|---|---|---|---|---|---|---|---|---|
| Example No. | pore volume* [mL/m²] | oil absorption* [mg/cm²] | print mottle | set-off | drying time [hr] | ink penetration length [mm] | OD | time to avoid set-off [s] |
| 14/1 | 3.2 | 60 | no | | | | | |
| 14/2 | 3.2 | 60 | yes | | | | | |
| 14/3 | 3.2 | 60 | yes | | | | | |
| 14/4 | 4.8 | 90 | yes | | | | | |
| 14/5 | 6.4 | 120 | no | | | | | |
| 14/6 | 4.8 | 90 | yes | | | | | |
| 14/7 | 1.2 | 22.5 | yes | yes | | | | |
| 14/8 | 1.6 | 30 | yes | yes | | | | |
| 14/9 | 2 | 37.5 | yes | no | | | | |
| 14/10 | 2.4 | 45 | yes | no | | | | |
| 14/11 | 2.8 | 52.5 | yes | no | | | | |
| 14/12 | 3.2 | 60 | no | no | | | | |
| 14/13 | 2.4 | 45 | yes | no | | | | |
| 14/14 | 2.4 | 45 | yes | slight | | | | |
| 14/15 | 2.4 | 45 | yes | yes | | | | |
| 14/16 | 2.4 | 45 | yes | yes | | | | |
| 14/17 | 3.2 | 60 | no | no | | 105.3 | 0.53 | 3 |
| 14/18 | 2.8 | 52.5 | no | no | | 108.7 | 0.51 | 3 |
| 14/19 | 2.4 | 45 | no | no | | 112.0 | 0.5 | 4 |
| 14/20 | 2 | 37.5 | no | no | | 109.3 | 0.48 | 5 |
| 14/21 | 1.6 | 30 | no | yes | >24 | 116.0 | 0.41 | 6 |
| 14/22 | 1.2 | 22.5 | yes/no | yes | >24 | 126.3 | 0.36 | >13 |
| 14/23 | 0.8 | 15 | yes | yes | >120 | 143.0 | 0.29 | >13 |
| 14/24 | 2.4 | 45 | no | no | | 115.3 | 0.51 | 3 |

TABLE 27-continued

| | | | visual inspection tests | | | tests with IGT Global Standard Tester-2 | | |
|---|---|---|---|---|---|---|---|---|
| | pore | oil | | | drying | ink penetration | | time to |
| Example No. | volume* [mL/m²] | absorption* [mg/cm²] | print mottle | set-off | time [hr] | length [mm] | OD | avoid set-off [s] |
| 14/25 | 1.6 | 30 | no | no | | 121.3 | 0.42 | 5 |
| 14/26 | 0.8 | 15 | no | yes | >24 | 139.7 | 0.33 | >13 |

The results in Table 27 clearly show for receiving layers based on Latex 04 and porous pigment PP21 that the combined requirements of avoiding print mottle and avoiding set-off with sufficiently rapid drying could only be realized with a ca. 1:1 weight ratio of Latex 04 to porous pigment PP21 together with a sufficient coverage of both ingredients i.e. sufficient porosity. These results clearly show that the required results were only realized at or above a theoretically available pore volume in the layer of 1.5 mL/m². Print mottle is due to the solvent content of the printing ink being absorbed too slowly and set-off is due to the ink drying insufficiently quickly.

It has been surprisingly found that excellent printing behaviour can be obtained by practicing the various aspects of the present invention, these aspects including but not limited to coating a water-resistant support with a single layer with a layer thickness of at least 3 µm, a pore volume of at least 1.2 mL/m² and which comprises at least one porous pigment.

The papers of the present invention provide, among other advantages, satisfactory printing under a wide range of printing conditions ensuring a constant printing quality over a long print run, e.g., variation in the quantity of ink, variation in the quantity of fountain in offset printing, with sufficiently fast drying to avoid offset of the image on following sheets (so-called ghost images) while ensuring that the ink is completely transferred to the paper during the printing process. These papers also exhibit acceptable whiteness, so not affect the colour of the print, exhibit acceptable opacity, are water-resistant, exhibit good scratch resistance, exhibit good chemical resistance to acids and alkali's and/or are suitable for outside applications, i.e., are resistant to UV-exposure and oxidation.

The present invention may include any feature or combination of features disclosed herein either implicitly or explicitly or any generalisation thereof. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A printable paper comprising a water-resistant support having two optionally subbed sides and a single layer on at least one of said optionally subbed sides, wherein said single layer has no substantial compositional variation, has a layer thickness of at least 3 µm, a pore volume of 1.5 to 6.4 mL/m² and comprises at least one porous pigment, wherein said water-resistant support is a polyester having dispersed therein 5 to 20% by weight of a styrene-acrylonitrile-block copolymer and 0.1 to 10% by weight of isotactic poly(4-methyl-1-pentene).

2. A printable paper comprising a water-resistant support having two optionally subbed sides and a single layer on at least one of said optionally subbed sides, wherein said single layer has no substantial compositional variation, has a layer thickness of at least 3 µm, a pore volume of at least 1.2 mL/m² and comprises at least one porous pigment, and further comprises at least one anionic acrylic latex or an aliphatic polyurethane latex, wherein said water-resistant support is a polyester having dispersed therein 5 to 20% by weight of a styrene-acrylonitrile-block copolymer and 0.1 to 10% by weight of isotactic poly(4-methyl-1-pentene).

3. The printable paper according to claim 2, wherein said single layer further comprises at least one water-soluble binder.

4. The printable paper according to claim 3, wherein said water-soluble binder is a hydrolyzed homo or copolymer of a vinylester.

5. The printable paper according to claim 4, wherein said hydrolyzed homo or copolymer of a vinylester is a hydrolyzed homo or copolymer of vinyl acetate.

6. The printable paper according to claim 2, wherein said single layer further comprises at least one insolubilizing agent unless said latex is solubilized with ammonium hydroxide.

7. The printable paper according to claim 6, wherein said insolubilizing agent is selected from the group consisting of: polyisocyanates, formaldehyde, formaldehyde derivatives, glutaraldehyde, glyoxal, glyoxal-derivatives, dimethylol urea, polyanionic metallic compounds and melamine-formaldehyde resins, polyalkoxysilanes, and carboxylic acid anhydrides which contain a plurality of anhydride moieties on each molecular entity.

8. The printable paper according to claim 2, wherein said single layer further comprises at least one hardened initially water-soluble polyhydroxy resin.

\* \* \* \* \*